United States Patent
Polcyn et al.

(10) Patent No.: US 10,654,749 B2
(45) Date of Patent: *May 19, 2020

(54) SOLAR CONTROL COATINGS PROVIDING INCREASED ABSORPTION OR TINT

(71) Applicant: Vitro Flat Glass LLC, Cheswick, PA (US)

(72) Inventors: Adam D. Polcyn, Pittsburgh, PA (US); Paul A. Medwick, Wexford, PA (US); Andrew V. Wagner, Pittsburgh, PA (US); Paul R. Ohodnicki, Allison Park, PA (US); James P. Thiel, Lihue, HI (US); Dennis J. O'Shaughnessy, Allison Park, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,386

(22) Filed: May 17, 2019

(65) Prior Publication Data

US 2019/0276353 A1    Sep. 12, 2019

Related U.S. Application Data

(60) Division of application No. 15/682,185, filed on Aug. 21, 2017, which is a continuation-in-part of (Continued)

(51) Int. Cl.
*B32B 15/04* (2006.01)
*B32B 17/06* (2006.01)
(Continued)

(52) U.S. Cl.
CPC ........ *C03C 17/366* (2013.01); *C03C 17/3429* (2013.01); *C03C 17/36* (2013.01);
(Continued)

(58) Field of Classification Search
USPC .................................................. 428/426, 688
See application file for complete search history.

(56) References Cited

U.S. PATENT DOCUMENTS

| | | |
|---|---|---|
| 4,193,236 A | 3/1980 | Mazzoni et al. |
| 4,379,040 A | 4/1983 | Gillery |

(Continued)

FOREIGN PATENT DOCUMENTS

| | | |
|---|---|---|
| CN | 1906136 A | 1/2007 |
| CN | 101321704 A | 12/2008 |

(Continued)

OTHER PUBLICATIONS

JP2001353810 English machine translation, 2019.*

*Primary Examiner* — Lauren R Colgan
(74) *Attorney, Agent, or Firm* — The Webb Law Firm

(57) ABSTRACT

A coated article includes a substrate, a first dielectric layer, a subcritical metallic layer having discontinuous metallic regions, a primer over the subcritical layer, and a second dielectric layer over the primer layer. The primer can be a nickel-chromium alloy. The primer can be a multilayer primer having a first layer of a nickel-chromium alloy and a second layer of titania.

9 Claims, 7 Drawing Sheets

Related U.S. Application Data application No. 14/204,230, filed on Mar. 11, 2014, now abandoned, application No. 16/415,386, which is a continuation-in-part of application No. 13/072,866, filed on Mar. 28, 2011, now Pat. No. 9,932,267.

(60) Provisional application No. 61/777,266, filed on Mar. 12, 2013, provisional application No. 61/318,471, filed on Mar. 29, 2010.

(51) Int. Cl.
    *C03C 17/36* (2006.01)
    *C03C 17/34* (2006.01)

(52) U.S. Cl.
    CPC ...... *C03C 17/3639* (2013.01); *C03C 17/3644* (2013.01); *Y10T 428/12542* (2015.01); *Y10T 428/24851* (2015.01)

(56) References Cited

U.S. PATENT DOCUMENTS

| | | | |
|---|---|---|---|
| 4,462,884 A | 7/1984 | Gillery et al. | |
| 4,464,874 A | 8/1984 | Shea, Jr. et al. | |
| 4,466,562 A | 8/1984 | DeTorre | |
| 4,610,771 A * | 9/1986 | Gillery | C03C 17/36 204/192.1 |
| 4,671,155 A | 6/1987 | Goldinger | |
| 4,716,086 A | 12/1987 | Gillery et al. | |
| 4,746,347 A | 5/1988 | Sensi | |
| 4,792,536 A | 12/1988 | Pecoraro et al. | |
| 4,806,220 A | 2/1989 | Finley | |
| 4,861,669 A | 8/1989 | Gillery | |
| 4,898,789 A | 2/1990 | Finley | |
| 4,898,790 A | 2/1990 | Finley | |
| 4,900,633 A | 2/1990 | Gillery | |
| 4,920,006 A | 4/1990 | Gillery | |
| 4,938,857 A | 7/1990 | Gillery | |
| 5,030,593 A | 7/1991 | Heithoff | |
| 5,030,594 A | 7/1991 | Heithoff | |
| 5,059,295 A | 10/1991 | Finley | |
| 5,088,258 A | 2/1992 | Schield et al. | |
| 5,106,663 A | 4/1992 | Box | |
| 5,178,966 A | 1/1993 | Gillery | |
| 5,240,886 A | 8/1993 | Gulotta et al. | |
| 5,328,768 A | 7/1994 | Goodwin | |
| 5,385,872 A | 1/1995 | Gulotta et al. | |
| 5,393,593 A | 2/1995 | Gulotta et al. | |
| 5,418,039 A | 5/1995 | Carter | |
| 5,425,861 A | 6/1995 | Hartig et al. | |
| 5,492,750 A | 2/1996 | Shumaker, Jr. et al. | |
| 5,513,040 A | 4/1996 | Yang | |
| 5,521,765 A | 5/1996 | Wolfe | |
| 5,584,902 A | 12/1996 | Hartig et al. | |
| 5,821,001 A | 10/1998 | Arbab et al. | |
| 5,916,401 A | 6/1999 | Gannon | |
| 5,942,338 A * | 8/1999 | Arbab | C03C 17/36 428/623 |
| 5,999,315 A | 12/1999 | Fukano et al. | |
| 6,045,896 A | 4/2000 | Boire et al. | |
| 6,104,530 A | 8/2000 | Okamura et al. | |
| 6,252,703 B1 | 6/2001 | Nakamura et al. | |
| 6,353,501 B1 | 3/2002 | Woodruff et al. | |
| 6,391,462 B1 | 5/2002 | Jang | |
| 6,398,925 B1 | 6/2002 | Arbab et al. | |
| 6,783,876 B2 * | 8/2004 | Schicht | C03C 17/2453 428/697 |
| 6,802,943 B2 | 10/2004 | Stachowiak | |
| 6,965,191 B2 | 11/2005 | Koike et al. | |
| 7,339,728 B2 | 3/2008 | Hartig | |
| 7,473,471 B2 | 1/2009 | Finley et al. | |
| 7,659,002 B2 | 2/2010 | Coster et al. | |
| 7,901,781 B2 | 3/2011 | Maschwitz et al. | |
| 3,231,977 A1 | 7/2012 | Roquiny et al. | |
| 8,865,325 B2 | 10/2014 | Polcyn et al. | |
| 9,423,157 B2 | 8/2016 | Villuendas Yuste et al. | |
| 9,604,875 B2 | 3/2017 | Polcyn et al. | |
| 9,708,215 B2 | 7/2017 | Gerardin et al. | |
| 2002/0102352 A1 * | 8/2002 | Hartig | C03C 17/36 427/165 |
| 2003/0049464 A1 | 3/2003 | Glenn et al. | |
| 2003/0186064 A1 * | 10/2003 | Murata | B32B 17/10174 428/432 |
| 2004/0009356 A1 * | 1/2004 | Medwick | C03C 17/36 428/432 |
| 2004/0028953 A1 * | 2/2004 | Kraemling | B32B 17/10 428/698 |
| 2004/0033384 A1 | 2/2004 | Funkenbusch et al. | |
| 2004/0086652 A1 | 5/2004 | Degand | |
| 2004/0146645 A1 | 6/2004 | Freeman et al. | |
| 2005/0026002 A1 * | 2/2005 | Hartig | C03C 17/36 428/702 |
| 2005/0123772 A1 * | 6/2005 | Coustet | C03C 17/36 428/432 |
| 2005/0208281 A1 * | 9/2005 | Decroupet | B32B 17/10036 428/216 |
| 2006/0083938 A1 | 4/2006 | Kim et al. | |
| 2006/0147727 A1 | 7/2006 | Glenn et al. | |
| 2006/0287408 A1 | 12/2006 | Baikerikar et al. | |
| 2007/0116967 A1 | 5/2007 | Medwick et al. | |
| 2007/0224432 A1 | 9/2007 | Morimoto et al. | |
| 2007/0237980 A1 * | 10/2007 | Hartig | C03C 17/36 428/623 |
| 2007/0242359 A1 | 10/2007 | Thielsch et al. | |
| 2007/0281178 A1 | 12/2007 | Oh et al. | |
| 2007/0298265 A1 | 12/2007 | Morimoto et al. | |
| 2008/0174872 A1 | 7/2008 | Morimoto et al. | |
| 2008/0187692 A1 * | 8/2008 | Roquiny | C03C 17/36 428/34 |
| 2008/0311389 A1 * | 12/2008 | Roquiny | C03C 17/36 428/336 |
| 2009/0015909 A1 | 1/2009 | Fleury et al. | |
| 2009/0109537 A1 | 4/2009 | Bright et al. | |
| 2009/0136765 A1 | 5/2009 | Maschwitz et al. | |
| 2009/0297864 A1 | 12/2009 | Lingle et al. | |
| 2009/0303602 A1 | 12/2009 | Bright et al. | |
| 2010/0046191 A1 | 2/2010 | den Boer et al. | |
| 2010/0062245 A1 | 3/2010 | Martin et al. | |
| 2011/0008641 A1 | 1/2011 | Di Stefano | |
| 2011/0117300 A1 | 5/2011 | Wagner | |
| 2011/0169402 A1 | 7/2011 | Lingle et al. | |
| 2011/0236663 A1 | 9/2011 | Fleury et al. | |
| 2011/0236715 A1 | 9/2011 | Polcyn et al. | |
| 2011/0261442 A1 | 10/2011 | Knoll et al. | |
| 2011/0262726 A1 | 10/2011 | Knoll et al. | |
| 2011/0268941 A1 | 11/2011 | Fischer et al. | |
| 2012/0207923 A1 | 8/2012 | Baumgartner | |
| 2014/0087160 A1 | 3/2014 | McSporran et al. | |
| 2015/0004383 A1 | 1/2015 | Sandre-Chardonnal | |
| 2015/0185382 A1 | 7/2015 | Leyder et al. | |
| 2016/0223729 A1 | 8/2016 | Medwick et al. | |
| 2017/0059753 A1 | 3/2017 | Wagner et al. | |
| 2018/0148371 A1 | 5/2018 | Polcyn et al. | |
| 2019/0023610 A1 | 1/2019 | Fischer et al. | |

FOREIGN PATENT DOCUMENTS

| | | | |
|---|---|---|---|
| JP | 62174189 A | | 7/1987 |
| JP | 2000192227 A | | 7/2000 |
| JP | 2001353810 | * | 12/2001 |
| JP | 2001353810 A | | 12/2001 |
| JP | 2002533565 A | | 10/2002 |
| JP | 20129873 A | | 1/2012 |
| KR | 1020070104672 A | | 10/2007 |
| KR | 1020080066019 A | | 7/2008 |
| KR | 1020090018145 A | | 2/2009 |
| KR | 1020110128285 A | | 11/2011 |
| KR | 1020120016129 A | | 2/2012 |
| KR | 1020130002337 A | | 1/2013 |
| RU | 2152911 C2 | | 7/2000 |
| WO | 9613379 | | 5/1996 |
| WO | 0029346 A1 | | 5/2000 |
| WO | 2010046509 A1 | | 4/2010 |

(56) References Cited

FOREIGN PATENT DOCUMENTS

| WO | 2012143704 A1 | 10/2012 |
| WO | 2014080141 A1 | 5/2014 |
| WO | 2014164695 A1 | 10/2014 |
| WO | 2017198362 A1 | 11/2017 |

* cited by examiner

SOLAR CONTROL COATINGS PROVIDING INCREASED ABSORPTION OR TINT

CROSS REFERENCE TO RELATED APPLICATIONS

This application is a divisional application of U.S. patent application Ser. No. 15/682,185 which is a continuation-in-part of U.S. patent application Ser. No. 14/204,230, filed Mar. 11, 2014, which claims priority to U.S. Provisional Application No. 61/777,266, filed Mar. 12, 2013. This application is also a continuation-in-part of U.S. patent application Ser. No. 13/072,866, filed Mar. 28, 2011, which claims priority to U.S. Provisional Application No. 61/318,471, filed Mar. 29, 2010, all of which are incorporated herein by reference in their entirety.

BACKGROUND OF THE INVENTION

Field of the Invention

This invention relates generally to solar control coatings and, in one particular embodiment, to a solar control coating having increased absorbance or tint.

Technical Considerations

Solar control coatings are known in the fields of architectural and vehicle transparencies. These solar control coatings block or filter selected ranges of electromagnetic radiation, such as in the range of solar infrared or solar ultraviolet radiation, to reduce the amount of solar energy entering the vehicle or building. This reduction of solar energy transmittance helps reduce the load on the cooling units of the vehicle or building.

These solar control coatings typically include one or more continuous metal layers to provide solar energy reflection, particularly in the solar infrared region. Metal layers deposited below a critical thickness (referred to herein as "subcritical layers") form discontinuous regions or islands rather than a continuous layer. These discontinuous layers absorb electromagnetic radiation through an effect known as surface Plasmon resonance. These subcritical layers typically have higher absorbance in the visible region than a continuous layer of the same material and also have lower solar energy reflectance.

For some applications, tinted glass is desired. Tinted glass is conventionally produced by adding special colorants to the glass batch material. In a float glass process, this addition is time consuming, increases costs, and is potentially harmful to the float tank. Also, it is tedious to transition the float tank from producing tinted glass to glass having a different tint or no tint. Also, tinted glass is typically produced on a campaign basis and then stored for long periods of time, sometimes resulting in spoiling of the tint due to glass corrosion before it can be coated or sold.

It would be desirable to produce a solar control coating in which the absorption of the coating and/or the tint of the glass product could be more easily controlled.

SUMMARY OF THE INVENTION

In one broad aspect of the invention, the coating of the invention includes one or more continuous, infrared reflective metal layers in combination with a subcritical (i.e., discontinuous) metal layer. The discontinuous metal layer increases the visible light absorption of the coating and, in combination with dielectric layers of appropriate thickness, can also provide the coated article with asymmetrical reflectance.

A coating of the invention comprises a plurality of metallic layers alternating with a plurality of dielectric layers, with at least one of the metallic layers comprising a subcritical metallic layer having discontinuous metal regions.

A coated article comprises a substrate and a coating stack over at least a portion of the substrate. The coating stack comprises a plurality of metallic layers and a plurality of dielectric layers, wherein at least one of the metallic layers comprises a subcritical metallic layer having discontinuous metallic regions.

Another coated article comprises a glass substrate and a coating formed over at least a portion of the glass substrate. The coating comprises a first dielectric layer formed over at least a portion of the glass substrate; a continuous metallic layer formed over at least a portion of the first dielectric layer; a second dielectric layer formed over at least a portion of the first metallic layer; a subcritical metallic layer formed over at least a portion of the second dielectric layer such that the subcritical metallic layer forms discontinuous metallic regions; a third dielectric layer formed over at least a portion of the subcritical metallic layer; a third continuous metal layer formed over at least portion of the third dielectric layer; a third dielectric layer formed over at least a portion of the third metal layer; and a protective layer formed over at least a portion of the third metallic layer.

A further coated article comprises a substrate and a coating comprising a first dielectric layer formed over at least a portion of the substrate; a first metallic layer formed over at least a portion of the first dielectric layer; a second dielectric layer formed over at least a portion of the first metallic layer; a second metallic layer formed over at least a portion of the second dielectric layer; and a third dielectric layer formed over at least a portion of the second metallic layer. At least one of the metallic layers is a subcritical metallic layer having discontinuous metallic regions.

An additional coated article comprises a substrate and a coating stack over at least a portion of the substrate. The coating stack comprises a first dielectric layer; at least one discontinuous metallic layer over the first dielectric layer; and a second dielectric layer over the discontinuous metallic layer. A further coated article comprises a substrate and a coating formed over at least a portion of the substrate. The coating comprises a first dielectric layer formed over at least a portion of the substrate and comprising a zinc oxide layer over a zinc stannate layer; a first, continuous metallic silver layer comprising silver over the first dielectric layer; a first primer layer over the first continuous metallic silver layer, the first primer comprising titanium; a second dielectric layer over the first primer layer comprising a zinc stannate layer over a zinc oxide layer; a second, discontinuous metallic silver layer over the second dielectric layer; a second primer over the second discontinuous metallic silver layer and comprising a nickel-chromium alloy; a third dielectric layer over the second primer layer and comprising a zinc oxide layer, a zinc stannate layer, and another zinc oxide layer; a third continuous metallic silver layer over the third dielectric layer; a third primer layer comprising titanium over the third continuous metallic silver layer; a fourth dielectric layer comprising a zinc stannate layer over a zinc oxide layer over the third primer layer; and a protective coating comprising titania over the fourth dielectric coating.

An architectural transparency of the invention comprises a substrate having a first dielectric layer formed over at least a portion of the substrate. A continuous metallic layer is formed over at least a portion of the first dielectric layer. A second dielectric layer is formed over at least a portion of the first metallic layer. A subcritical metallic layer is formed over at least a portion of the second dielectric layer such that the subcritical metallic layer forms discontinuous metallic regions. A third dielectric layer is formed over at least a portion of the subcritical metallic layer. The metals of the continuous metallic layer and the subcritical metallic layer can be the same or different metals.

Another architectural transparency of the invention comprises a glass substrate with a first dielectric layer formed over at least a portion of the glass substrate. A continuous first metallic layer is formed over at least a portion of the first dielectric layer. A second dielectric layer is formed over at least a portion of the first metallic layer. A second metal layer (subcritical metallic layer) is formed over at least a portion of the second dielectric layer such that the subcritical metallic layer forms discontinuous metallic regions. A third dielectric layer is formed over at least a portion of the subcritical metallic layer. A continuous third metal layer is formed over at least a portion of the third dielectric layer. A protective layer is formed over at least a portion of the third metallic layer. The metals of the continuous metallic layers and the subcritical metallic layer can be the same or different metals. A fourth dielectric layer is formed over at least a portion of the third metallic layer under the protective layer.

A further architectural transparency comprises a substrate with a first dielectric layer formed over at least a portion of the substrate. A continuous first metal layer is formed over at least a portion of the first dielectric layer. An absorbing layer is formed over at least a portion of the first metal layer. The absorbing layer comprises a first silicon nitride film, a metal layer formed over at least a portion of the first silicon nitride film, and a second silicon nitride film formed over the metal layer.

Another architectural transparency comprises a glass substrate with a first dielectric layer formed over at least a portion of the glass substrate. A continuous first metal layer is formed over at least a portion of the first dielectric layer. A first primer layer is formed over at least a portion of the first metal layer. The first primer layer comprises a multi-film layer. A second dielectric layer is formed over the first primer layer. A second continuous metal layer is formed over the second dielectric layer. A second primer layer is formed over the second metal layer. The second primer layer comprises a multi-film layer. The first and second primer layers can comprise a nickel-chromium alloy layer (such as Inconel) and a metal layer, such as titanium.

A coated article having a tinted appearance in reflection and/or transmission comprises a substrate, a first dielectric layer, a subcritical metallic layer having discontinuous metallic regions, an optional primer layer over the subcritical layer, and a second dielectric layer over the primer layer. The primer can comprise a nickel-chromium alloy. For example, the primer can comprise a multilayer primer having a first layer comprising a nickel-chromium alloy and a second layer comprising titania. Alternatively, the primer can comprise a zinc and tin material deposited as a metal and subsequently oxidized to form an oxide layer.

Another coated article having a tinted appearance in reflection and/or transmission comprises a substrate, a first dielectric layer, an absorbing layer, and a second dielectric layer over the absorbing layer. The absorbing layer can comprise at least one of a nickel-chromium alloy (such as Inconel), titanium nitride, cobalt chrome (stellite), or nickel chrome. A primer layer can be located over the absorbing layer. The primer layer can comprise titanium.

A method of making a coated article having a tinted appearance in reflection and/or transmission, wherein the article comprises a substrate, a first dielectric layer, a subcritical metallic layer having discontinuous metallic regions, an optional primer over the subcritical layer, and a second dielectric layer over the primer layer. The method includes selecting a metal for the subcritical metallic layer, selecting a primer material and thickness, and selecting dielectric material(s) and thickness to provide the coating with an absorbed color (e.g., tint) simulating the color of conventional tinted glass.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
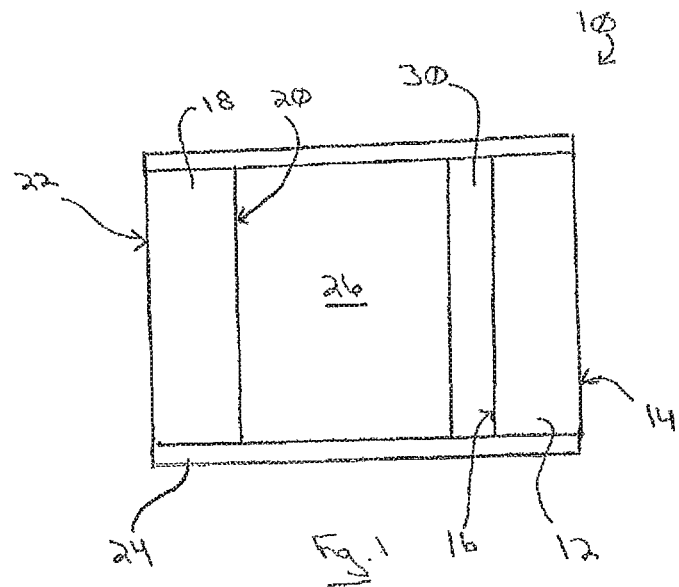
FIG. 1 is a side view (not to scale) of an insulating glass unit (IGU) having a coating of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. Additionally, all documents, such as, but not limited to, issued patents and patent applications, referred to herein are to be considered to be "incorporated by reference" in their entirety. As used herein, the term "film" refers to a coating region of a desired or selected coating composition. A "layer" can comprise one or more "films", and a "coating" or "coating stack" can comprise one or more "layers". The term "asymmetrical reflectivity" means that the visible light reflectance of the coating from one side is different than that of the coating from the opposite side. The term "critical thickness" means a thickness above which a coating material forms a continuous, uninterrupted layer and below which the coating material forms discontinuous regions or islands of the coating material rather than a continuous layer. The term "subcritical thickness" means a thickness below the critical thickness such that the coating material forms isolated, non-connected regions of the coating material. The term "islanded" means that the coating material is not a continuous layer but, rather, that the material is deposited to form isolated regions or islands.

For purposes of the following discussion, the invention will be discussed with reference to use with an architectural transparency, such as, but not limited to, an insulating glass unit (IGU). As used herein, the term "architectural transparency" refers to any transparency located on a building, such as, but not limited to, windows and sky lights. However, it is to be understood that the invention is not limited to use with such architectural transparencies but could be practiced with transparencies in any desired field, such as, but not limited to, laminated or non-laminated residential and/or commercial windows, insulating glass units, and/or transparencies for land, air, space, above water and underwater vehicles. Therefore, it is to be understood that the specifically disclosed exemplary embodiments are presented simply to explain the general concepts of the invention, and that the invention is not limited to these specific exemplary embodiments. Additionally, while a typical "transparency" can have sufficient visible light transmission such that materials can be viewed through the transparency, in the practice of the invention, the "transparency" need not be transparent to visible light but may be translucent or opaque.

A non-limiting transparency 10 incorporating features of the invention is illustrated in FIG. 1. The transparency 10 can have any desired visible light, infrared radiation, or ultraviolet radiation transmission and/or reflection. For example, the transparency 10 can have a visible light transmission of any desired amount, e.g., greater than 0% up to 100%.

The exemplary transparency 10 of FIG. 1 is in the form of a conventional insulating glass unit and includes a first ply 12 with a first major surface 14 (No. 1 surface) and an opposed second major surface 16 (No. 2 surface). In the illustrated non-limiting embodiment, the first major surface 14 faces the building exterior, i.e., is an outer major surface, and the second major surface 16 faces the interior of the building. The transparency 10 also includes a second ply 18 having an outer (first) major surface 20 (No. 3 surface) and an inner (second) major surface 22 (No. 4 surface) and spaced from the first ply 12. This numbering of the ply surfaces is in keeping with conventional practice in the fenestration art. The first and second plies 12, 18 can be connected together in any suitable manner, such as by being adhesively bonded to a conventional spacer frame 24. A gap or chamber 26 is formed between the two plies 12, 18. The chamber 26 can be filled with a selected atmosphere, such as air, or a non-reactive gas such as argon or krypton gas. A solar control coating 30 (or any of the other coatings described below) is formed over at least a portion of one of the plies 12, 18, such as, but not limited to, over at least a portion of the No. 2 surface 16 or at least a portion of the No. 3 surface 20. Although, the coating could also be on the No. 1 surface or the No. 4 surface, if desired. Examples of insulating glass units are found, for example, in U.S. Pat. Nos. 4,193,236; 4,464,874; 5,088,258; and 5,106,663.

In the broad practice of the invention, the plies 12, 18 of the transparency 10 can be of the same or different materials. The plies 12, 18 can include any desired material having any desired characteristics. For example, one or more of the plies 12, 18 can be transparent or translucent to visible light. By "transparent" is meant having visible light transmission of greater than 0% up to 100%. Alternatively, one or more of the plies 12, 18 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The first and second plies 12, 18 can each be, for example, clear float glass or can be tinted or colored glass or one ply 12, 18 can be clear glass and the other ply 12, 18 colored glass. Although not limiting to the invention, examples of glass suitable for the first ply 12 and/or second ply 18 are described in U.S. Pat. Nos. 4,746,347; 4,792,536; 5,030,593; 5,030,594; 5,240,886; 5,385,872; and 5,393,593. The first and second plies 12, 18 can be of any desired dimensions, e.g., length, width, shape, or thickness. In one exemplary automotive transparency, the first and second plies can each be 1 mm to 10 mm thick, such as 1 mm to 8 mm thick, such as 2 mm to 8 mm, such as 3 mm to 7 mm, such as 5 mm to 7 mm, such as 6 mm thick. Non-limiting examples of glass that can be used for the practice of the invention include clear glass, Starphire®, Solargreen®, Solextra®, GL-20®, GL35™, Solarbronze®, Solargray® glass, Pacifica® glass, SolarBlue® glass, and Optiblue® glass, all commercially available from PPG Industries Inc. of Pittsburgh, Pa.

The solar control coating 30 of the invention is deposited over at least a portion of at least one major surface of one of the glass plies 12, 18. In the example shown in FIG. 1, the coating 30 is formed over at least a portion of the inner surface 16 of the outboard glass ply 12. As used herein, the term "solar control coating" refers to a coating comprised of one or more layers or films that affect the solar properties of the coated article, such as, but not limited to, the amount of solar radiation, for example, visible, infrared, or ultraviolet radiation, reflected from, absorbed by, or passing through the coated article; shading coefficient; emissivity, etc. The solar control coating 30 can block, absorb, or filter selected portions of the solar spectrum, such as, but not limited to, the IR, UV, and/or visible spectrums.

The solar control coating 30 can be deposited by any conventional method, such as, but not limited to, conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition. In one non-limiting embodiment, the coating 30 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

Figure 2:
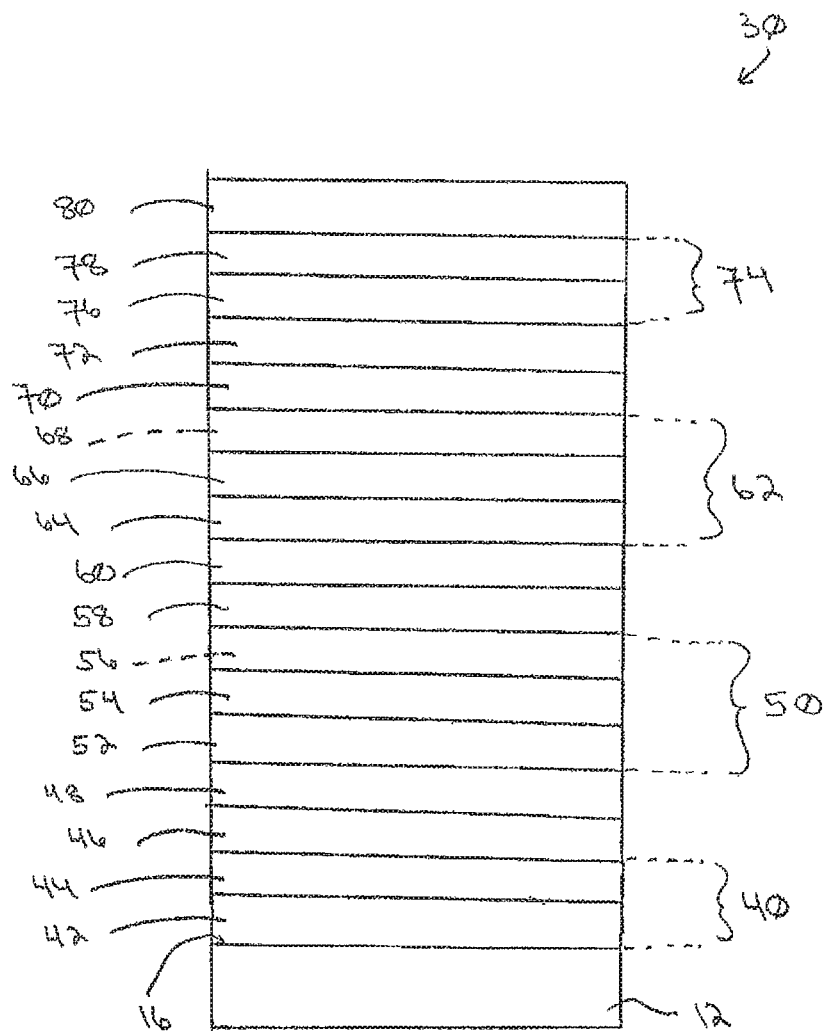
FIG. 2 is a side view (not to scale) of a coating incorporating features of the invention.

An exemplary non-limiting solar control coating 30 of the invention is shown in FIG. 2. This exemplary coating 30 includes a base layer or first dielectric layer 40 deposited over at least a portion of a major surface of a substrate (e.g., the No. 2 surface 16 of the first ply 12). The first dielectric layer 40 can be a single layer or can comprise more than one film of antireflective materials and/or dielectric materials, such as, but not limited to, metal oxides, oxides of metal alloys, nitrides, oxynitrides, or mixtures thereof. The first dielectric layer 40 can be transparent to visible light. Examples of suitable metal oxides for the first dielectric layer 40 include oxides of titanium, hafnium, zirconium, niobium, zinc, bismuth, lead, indium, tin, and mixtures thereof. These metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate, defined below), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 40 can be a substantially single phase film, such as a metal alloy oxide film, e.g., zinc stannate, or can be a mixture of phases composed of zinc and tin oxides or can be composed of a plurality of films.

For example, the first dielectric layer 40 (whether a single film or multiple film layer) can have a thickness in the range of 100 Å to 600 Å, such as 200 Å to 500 Å, such as 250 Å to 350 Å, such as 250 Å to 310 Å, such as 280 Å to 310 Å, such as 300 Å to 330 Å, such as 310 Å to 330 Å.

The first dielectric layer 40 can comprise a multi-film structure having a first film 42, e.g., a metal alloy oxide film, deposited over at least a portion of a substrate (such as the inner major surface 16 of the first ply 12) and a second film 44, e.g., a metal oxide or oxide mixture film, deposited over the first metal alloy oxide film 42. In one non-limiting embodiment, the first film 42 can be a zinc/tin alloy oxide. By "zinc/tin alloy oxide" is meant both true alloys and also mixtures of the oxides. The zinc/tin alloy oxide can be that obtained from magnetron sputtering vacuum deposition from a cathode of zinc and tin. One non-limiting cathode can comprise zinc and tin in proportions of 5 wt. % to 95 wt. % zinc and 95 wt. % to 5 wt. % tin, such as 10 wt. % to 90 wt. % zinc and 90 wt. % to 10 wt. % tin. However, other ratios of zinc to tin could also be used. One suitable metal alloy oxide that can be present in the first film 42 is zinc stannate. By "zinc stannate" is meant a composition of $Zn_xSn_{1-x}O_{2-x}$ (Formula 1) where "x" varies in the range of greater than 0 to less than 1. For instance, "x" can be greater than 0 and can be any fraction or decimal between greater than 0 to less than 1. For example, where x=⅔, Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the film.

The second film 44 can be a metal oxide film, such as zinc oxide. The zinc oxide film can be deposited from a zinc cathode that includes other materials to improve the sputtering characteristics of the cathode. For example, the zinc cathode can include a small amount (e.g., up to 10 wt. %, such as up to 5 wt. %) of tin to improve sputtering. In which case, the resultant zinc oxide film would include a small percentage of tin oxide, e.g., up to 10 wt. % tin oxide, e.g., up to 5 wt. % tin oxide. A coating layer deposited from a zinc cathode having up to 10 wt. % tin (added to enhance the conductivity of the cathode) is referred to herein as "a zinc oxide film" even though a small amount of tin may be present. The small amount of tin in the cathode (e.g., less than or equal to 10 wt. %, such as less than or equal to 5 wt. %) is believed to form tin oxide in the predominantly zinc oxide second film 44.

For example, the first film 42 can be zinc stannate and the second film 44 can be zinc oxide (for example, 90 wt. % zinc oxide and 10 wt. % tin oxide). For example, the first film 42 can comprise zinc stannate having a thickness in the range of 50 Å to 600 Å, such as 50 Å to 500 Å, such as 75 Å to 350 Å, such as 100 Å to 250 Å, such as 150 Å to 250 Å, such as 195 Å to 250 Å, such as 200 Å to 250 Å, such as 200 Å to 220 Å.

The second film 44 can comprise zinc oxide having a thickness in the range of 50 Å to 200 Å, such as 75 Å to 200 Å, such as 100 Å to 150 Å, such as 100 Å to 110 Å.

For example, the first film 42 can be zinc stannate and the second film 44 can be zinc oxide (for example, 90 wt. % zinc oxide and 10 wt. % tin oxide).

A first heat and/or radiation reflective metallic layer 46 can be deposited over the first dielectric layer 40. The first reflective layer 46 can include a reflective metal, such as, but not limited to, metallic gold, copper, palladium, aluminum, silver, or mixtures, alloys, or combinations thereof. In one embodiment, the first reflective layer 46 comprises a metallic silver layer. The first metallic layer 46 is a continuous layer. By "continuous layer" is meant that the coating forms a continuous film of the material and not isolated coating regions.

The first metallic layer 46 can have a thickness in the range of 50 Å to 300 Å, e.g., 50 Å to 250 Å, e.g., 50 Å to 200 Å, such as 70 Å to 200 Å, such as 100 Å to 200 Å, such as 125 Å to 200 Å, such as 150 Å to 185 Å.

A first primer layer 48 is located over the first reflective layer 46. The first primer layer 48 can be a single film or a multiple film layer. The first primer layer 48 can include an oxygen-capturing material that can be sacrificial during the deposition process to prevent degradation or oxidation of the first reflective layer 46 during the sputtering process or subsequent heating processes. The first primer layer 48 can also absorb at least a portion of electromagnetic radiation, such as visible light, passing through the coating 30. Examples of materials useful for the first primer layer 48 include titanium, silicon, silicon dioxide, silicon nitride, silicon oxynitride, nickel-chrome alloys (such as Inconel), zirconium, aluminum, alloys of silicon and aluminum, alloys containing cobalt and chromium (e.g., Stellite®), and mixtures thereof. For example, the first primer layer 48 can be titanium.

The first primer 48 can have a thickness in the range of 5 Å to 50 Å, e.g., 10 Å to 40 Å, e.g., 20 Å to 40 Å, e.g., 20 Å to 35 Å.

A second dielectric layer 50 is located over the first reflective layer 46 (e.g., over the first primer layer 48). The second dielectric layer 50 can comprise one or more metal oxide or metal alloy oxide-containing films, such as those described above with respect to the first dielectric layer 40. For example, the second dielectric layer 50 can include a first metal oxide film 52, e.g., a zinc oxide film, deposited over the first primer film 48 and a second metal alloy oxide film 54, e.g., a zinc stannate ($Zn_2SnO_4$) film, deposited over the first zinc oxide film 52. An optional third metal oxide film 56, e.g., another zinc oxide layer, can be deposited over the zinc stannate layer.

The second dielectric layer 50 can have a total thickness (e.g., the combined thicknesses of the layers) is in the range of 50 Å to 1000 Å, e.g., 50 Å to 500 Å, e.g., 100 Å to 370 Å, e.g., 100 Å to 300 Å, e.g., 100 Å to 200 Å, e.g., 150 Å to 200 Å, e.g., 180 Å to 190 Å.

For example, for a multi-film layer, the first metal oxide film 52 (and optional second metal oxide film 56, if present) can have a thickness in the range of 10 Å to 200 Å, e.g., 50 Å to 200 Å, e.g., 60 Å to 150 Å, e.g., 70 Å to 85 Å. The metal alloy oxide layer 54 can have a thickness in the range of 50 Å to 800 Å, e.g., 50 Å to 500 Å, e.g., 100 Å to 300 Å, e.g., 110 Å to 235 Å, e.g., 110 Å to 120 Å.

A subcritical thickness (discontinuous) second metallic layer 58 is located over the second dielectric layer 50 (e.g., over the second zinc oxide film 56, if present, or over the zinc stannate film 54 if not). The metallic material, such as, but not limited to, metallic gold, copper, palladium, aluminum, silver, or mixtures, alloys, or combinations thereof, is applied at a subcritical thickness such that isolated regions or islands of the material are formed rather than a continuous layer of the material. For silver, it has been determined that the critical thickness is less than 50 Å, such as less than 40 Å, such as less than 30 Å, such as less than 25 Å. For silver, the transition between a continuous layer and a subcritical layer occurs in the range of 25 Å to 50 Å. It is estimated that copper, gold, and palladium would exhibit similar subcritical behavior in this range. The second metallic layer 58 can include any one or more of the materials described above with respect to the first reflective layer 46 but these materials are not present as a continuous film. In one non-limiting embodiment, the second layer 58 comprises islanded silver with the islands having an effective thickness in the range of 1 Å to 70 Å, e.g., 10 Å to 40 Å, e.g., 10 Å to 35 Å, e.g., 10 Å to 30 Å, e.g., 15 Å to 30 Å, e.g., 20 Å to 30 Å, e.g., 25 Å to 30 Å. The subcritical metallic layer 58 absorbs electromagnetic radiation according to the Plasmon Resonance Theory. This absorption depends at least partly on the boundary conditions at the interface of the metallic islands. The subcritical metallic layer 58 is not an infrared reflecting layer, like the first metallic layer 46. The subcritical silver layer 58 is not a continuous layer. It is estimated that for silver, the metallic islands or balls of silver metal deposited below the subcritical thickness can have a height of about 2 nm to 7 nm, such as 5 nm to 7 nm. It is estimated that if the subcritical silver layer could be spread out uniformly, it would have a thickness of about 1.1 nm. It is estimated that optically, the discontinuous metal layer behaves as an effective layer thickness of 2.6 nm. Depositing the discontinuous metallic layer over zinc stannate rather than zinc oxide appears to increase the visible light absorbance of the coating, e.g., of the discontinuous metallic layer.

Alternatively still, the subcritical silver layer 58 can be eliminated and replaced with an absorbing layer. For example, this absorbing layer can be Inconel, titanium nitride, cobalt chrome (stellite), or a nickel chrome material. A primer layer, such as titanium, can be formed over the absorbing layer. The titanium layer will protect the absorbing layer from oxidation during deposition of the subsequent coating layers.

A second primer layer 60 can be deposited over the second metallic layer 58. The second primer layer 60 can be as described above with respect to the first primer layer 48. In one example, the second primer layer can be a nickel-chromium alloy (such as Inconel) having a thickness in the range of 5 Å to 50 Å, e.g., 10 Å to 25 Å, e.g., 15 Å to 25 Å, e.g., 15 Å to 22 Å. Since the absorbance of the subcritical material depends at least partly on the boundary conditions, different primers (e.g., having different refractive indices) can provide the coating with different absorbance spectra and, hence, with different tints. The second primer 60 can be a multi-layer primer having a first layer of Inconel and a second layer of titania. Alternatively, the second primer 60 can be eliminated and the next dielectric layer deposited directly onto the subcritical metallic layer 58. Alternatively, the second primer layer 60 can be titanium having a thickness in the range of 5 Å to 50 Å, e.g., 10 Å to 35 Å, e.g., 15 Å to 35 Å, e.g., 20 Å to 30 Å.

In the coating described above, the primer 60 over the subcritical layer 58 could alternatively be a zinc and tin primer. For example, a primer of zinc and tin metal can be sputtered in a non-reactive atmosphere, such a low oxygen or oxygen free atmosphere, from a cathode comprising zinc and tin. Then, the coated article could be subjected to further processing, such as the deposition of further oxide layers in an oxygen containing atmosphere. During this further deposition, the zinc and tin metal primer would oxidize to form zinc and tin oxide. For example, the coating can have 95 weight percent to 60 weight percent zinc oxide, such as 90 to 70 weight percent zinc oxide, such as 90 to 85 weight percent zinc oxide, with the remainder in each case being tin oxide.

Alternatively, the second primer 60 can be selected from titanium, silicon-aluminum alloys, nickel alloys, cobalt alloys, copper, aluminum, or any material that preferentially oxidizes before silver.

A third dielectric layer 62 can be deposited over the second metallic layer 58 (e.g., over the second primer film 60). The third dielectric layer 62 can also include one or more metal oxide or metal alloy oxide-containing layers, such as discussed above with respect to the first and second dielectric layers 40, 50. In one example, the third dielectric layer 62 is a multi-film layer similar to the second dielectric layer 50. For example, the third dielectric layer 62 can include a first metal oxide layer 64, e.g., a zinc oxide layer, a second metal alloy oxide-containing layer 66, e.g., a zinc stannate layer deposited over the zinc oxide layer 64, and an optional third metal oxide layer 68, e.g., another zinc oxide layer, deposited over the zinc stannate layer 66. In one example, both of the zinc oxide layers 64, 68 are present and each has a thickness in the range of 50 Å to 200 Å, such as 75 Å to 150 Å, such as 80 Å to 150 Å, such as 95 Å to 120 Å. The metal alloy oxide layer 66 can have a thickness in the range of 100 Å to 800 Å, e.g., 200 Å to 700 Å, e.g., 300 Å to 600 Å, e.g., 380 Å to 500 Å, e.g., 380 Å to 450 Å.

In the coating described above, the third dielectric layer 62 comprised a multifilm structure. However, the material of the third dielectric layer 62 above the subcritical layer can be selected to adjust the refractive index of the third dielectric layer 62. For example, the third dielectric layer can comprise one or more layers selected from zinc-tin oxides, zinc oxide, silicon-aluminum oxides, silicon-aluminum nitrides, titanium oxides, and titanium nitrides.

In one example, the total thickness of the third dielectric layer 62 (e.g., the combined thicknesses of the metal oxide and metal alloy oxide layers) is in the range of 200 Å to 1000 Å, e.g., 400 Å to 900 Å, e.g., 500 Å to 900 Å, e.g., 650 Å to 800 Å, e.g., 690 Å to 720 Å.

A third heat and/or radiation reflective metallic layer 70 is deposited over the third dielectric layer 62. The third reflective layer 70 can be of any of the materials discussed above with respect to the first reflective layer. In one non-limiting example, the third reflective layer 70 includes silver. The third primer metallic layer 70 can have a thickness in the range of 25 Å to 300 Å, e.g., 50 Å to 300 Å, e.g., 50 Å to 200 Å, such as 70 Å to 151 Å, such as 100 Å to 150 Å, such as 137 Å to 150 Å. The third metallic layer is preferably a continuous layer.

A third primer layer 72 is located over the third reflective layer 70. The third primer layer 72 can be as described above with respect to the first or second primer layers. In one non-limiting example, the third primer layer is titanium. The third primer layer 72 can have a thickness in the range of 5 Å to 50 Å, e.g., 10 Å to 33 Å, e.g., 20 Å to 30 Å.

A fourth dielectric layer 74 is located over the third reflective layer (e.g., over the third primer layer 72). The fourth dielectric layer 74 can be comprised of one or more metal oxide or metal alloy oxide-containing layers, such as those discussed above with respect to the first, second, or third dielectric layers 40, 50, 62. In one non-limiting example, the fourth dielectric layer 74 is a multi-film layer having a first metal oxide layer 76, e.g., a zinc oxide layer, deposited over the third primer film 72, and a second metal alloy oxide layer 78, e.g., a zinc stannate layer, deposited over the zinc oxide layer 76. In one non-limiting embodiment, the first metal oxide layer 76 can have a thickness in the range of 25 Å to 200 Å, such as 50 Å to 150 Å, such as 60 Å to 100 Å, such as 80 Å to 90 Å. The metal alloy oxide layer 78 can have a thickness in the range of 25 Å to 500 Å, e.g., 50 Å to 500 Å, e.g., 100 Å to 400 Å, e.g., 150 Å to 300 Å, e.g., 150 Å to 200 Å, e.g., 170 Å to 190 Å.

In one non-limiting example, the total thickness of the fourth dielectric layer 74 (e.g., the combined thicknesses of the zinc oxide and zinc stannate layers) is in the range of 100 Å to 800 Å, e.g., 200 Å to 600 Å, e.g., 250 Å to 400 Å, e.g., 250 Å to 270 Å.

An overcoat 80 can be located over the fourth dielectric layer 74. The overcoat 80 can help protect the underlying coating layers from mechanical and chemical attack. The overcoat 80 can be, for example, a metal oxide or metal nitride layer. For example, the overcoat 80 can be titania. The overcoat 80 can have a thickness in the range of 10 Å to 100 Å, such as 20 Å to 80 Å, such as 30 Å to 50 Å, such as 30 Å to 45 Å. Other materials useful for the overcoat include other oxides, such as silica, alumina, or a mixture of silica and alumina.

In one non-limiting embodiment, the transparency 10 of the invention has a percent reflectance (% R) of visible light from the No. 1 surface in the range of 5% to 50%, such as 20% to 40%, such as 25% to 30%. The transparency 10 has a visible light transmittance of greater than 20%, such as greater than 30%, such as greater than 40%. The transparency has a solar heat gain coefficient (SHGC) of less than 0.3, such as less than 0.27, such as less than 0.25.

Unlike prior articles, the ply coated with the coating 30 can be tempered or heat treated without adversely impacting upon the performance characteristics of the article or producing haze. Also, the article of the invention has a neutral or moderate reflected color, such as blue or blue-green, in both reflection and transmission.

Figure 3:
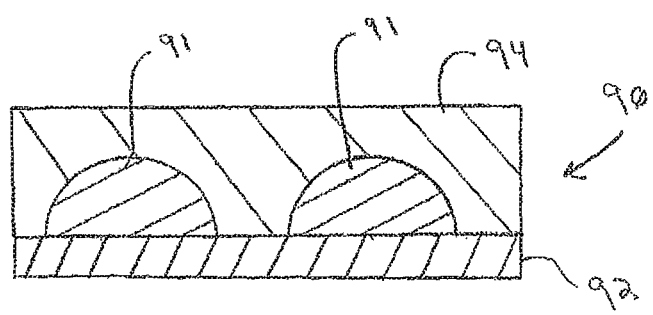
FIG. 3 is a side, sectional view (not to scale) of a subcritical metal layer with a primer layer.

The lack of haze upon heating is believed due to the islanded structure of the discontinuous intermediate metallic layer. A side view of a subcritical metallic layer 90 having discontinuous coating regions 91 formed on a dielectric layer 92 and covered by a primer layer 94 is shown in FIG. 3. The subcritical metal thickness causes the metal material to form discontinuous regions or islands of metal or metal oxide on the dielectric layer 92. When the primer layer is applied over the subcritical metal layer, the material of the primer layer covers the islands and can also extend into the gaps between adjacent islands of the subcritical metal and contact the underlying layer 92.

The coating 30 of the invention provides various advantages over known coatings. For example, the subcritical metallic layer increases the visible light absorbance of the coating, making the coated article darker. The combination of the subcritical metallic layer with selected thicknesses of the dielectric layers can provide the coated article with an asymmetrical reflectance. The color of the article can be tuned in transmission by changing the primer(s) used in the coating. Also, the coating of the invention is able to be heat treated without introducing haze.

It is to be understood that the previously described coating 30 is not limiting to the invention. For example, the subcritical metallic layer is not required to be the second (intermediate) metallic layer in the stack. The subcritical metallic layer could be placed anywhere in the coating stack. Also, for coating stacks having a plurality of metallic coating layers, more than one of the metallic layers could be a subcritical metallic layer.

While the above example included two continuous metal layers and one discontinuous metal layer, it is to be understood that this is just one non-limiting example. In the broad practice of the invention, the coating of the invention could include multiple continuous metallic layers and multiple discontinuous metallic layers. For example, a coated article could include a single subcritical metallic layer located between two dielectric layers. Or, the coating could include 3 or more metallic layers, such as 4 or more metallic layers, such as 5 or more metallic layers, such as 6 or more metallic layers, with at least one of the metallic layers being a subcritical metallic layer.

Figure 4:
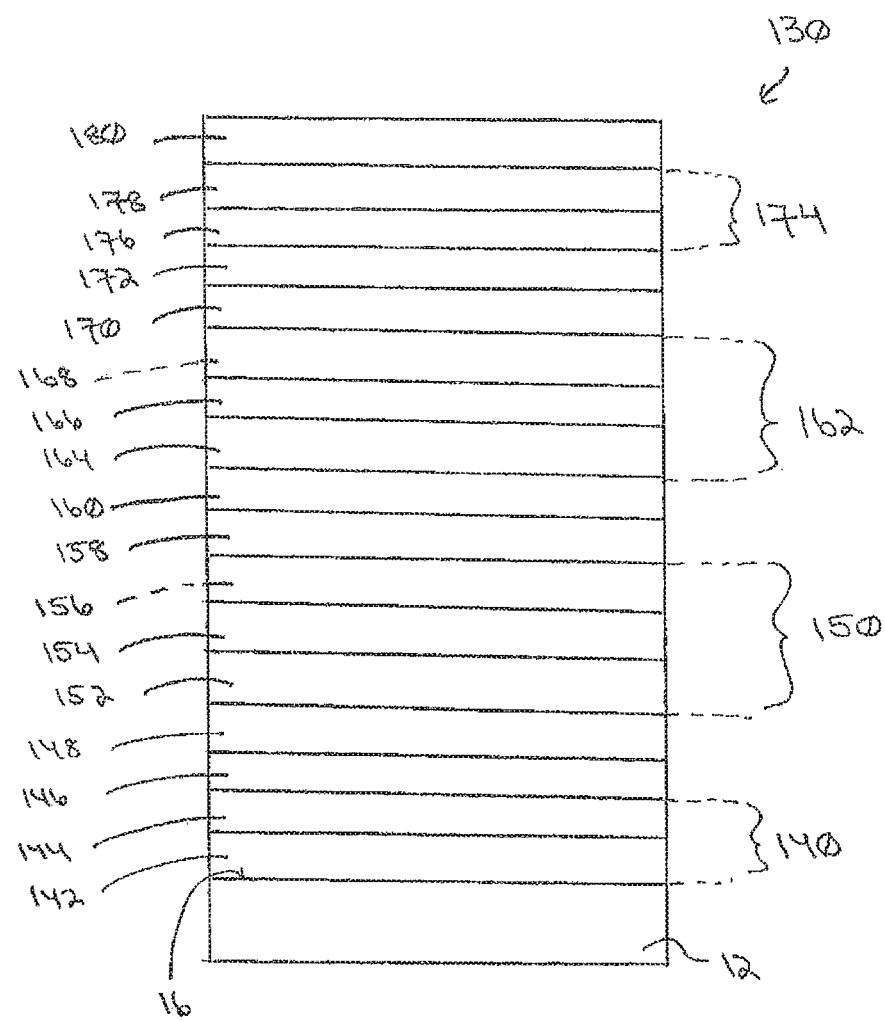
FIG. 4 is a side view (not to scale) of another coating incorporating features of the invention.

Another exemplary coating 130 of the invention is shown in FIG. 4. This exemplary coating 130 includes a base layer or first dielectric layer 140 deposited over at least a portion of a major surface of a substrate (e.g., the No. 2 surface 16 of the first ply 12). The first dielectric layer 140 can be similar to the first dielectric layer 40 described above. For example, the first dielectric layer 140 can be a single layer or can comprise more than one film of antireflective materials and/or dielectric materials, such as, but not limited to, metal oxides, oxides of metal alloys, nitrides, oxynitrides, or mixtures thereof. The first dielectric layer 140 can be transparent to visible light. Examples of suitable metal oxides for the first dielectric layer 140 include oxides of titanium, hafnium, zirconium, niobium, zinc, bismuth, lead, indium, tin, and mixtures thereof. These metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate, defined below), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 140 can be a substantially single phase film, such as a metal alloy oxide film, e.g., zinc stannate, or can be a mixture of phases composed of zinc and tin oxides or can be composed of a plurality of films.

For example, the first dielectric layer 140 (whether a single film or multiple film layer) can have a thickness in the range of 100 Å to 600 Å, such as 100 Å to 500 Å, such as 100 Å to 350 Å, such as 150 Å to 300 Å, such as 200 Å to 250 Å, such as 210 Å to 220 Å.

The first dielectric layer 140 can comprise a multi-film structure having a first film 142, e.g., a metal alloy oxide film, deposited over at least a portion of a substrate (such as the inner major surface 16 of the first ply 12) and a second film 144, e.g., a metal oxide or oxide mixture film, deposited over the first metal alloy oxide film 142. In one non-limiting embodiment, the first film 142 can be zinc stannate.

For example, the first film 142 can be zinc stannate and the second film 144 can be zinc oxide (for example, 90 wt. % zinc oxide and 10 wt. % tin oxide). For example, the first film 142 can comprise zinc stannate having a thickness in the range of 50 Å to 600 Å, such as 50 Å to 500 Å, such as 75 Å to 350 Å, such as 100 Å to 250 Å, such as 100 Å to 200 Å, such as 100 Å to 150 Å, such as 140 Å to 150 Å.

The second film 144 can comprise zinc oxide having a thickness in the range of 50 Å to 200 Å, such as 50 Å to 150 Å, such as 70 Å to 100 Å.

A first heat and/or radiation reflective metallic layer 146 can be deposited over the first dielectric layer 140. The first reflective layer 146 can include a reflective metal, such as, but not limited to, metallic gold, copper, palladium, silver, or mixtures, alloys, or combinations thereof. In one embodiment, the first reflective layer 46 comprises a metallic silver layer having a thickness in the range of 25 Å to 300 Å, e.g., 50 Å to 300 Å, e.g., 50 Å to 250 Å, e.g., 50 Å to 200 Å, such as 70 Å to 200 Å, such as 100 Å to 200 Å, such as 120 Å to 180 Å.

A first primer layer 148 is located over the first reflective layer 146. The first primer layer 148 can be a single film or a multiple film layer. The first primer layer 148 can include an oxygen-capturing material that can be sacrificial during the deposition process to prevent degradation or oxidation of the first reflective layer 146 during the sputtering process or subsequent heating processes. The first primer layer 148 can also absorb at least a portion of electromagnetic radiation, such as visible light, passing through the coating 130. Examples of materials useful for the first primer layer 148 include titanium, Inconel, Stellite®, and mixtures thereof. For example, the first primer layer 148 can have a thickness in the range of 5 Å to 50 Å, e.g., 10 Å to 40 Å, e.g., 20 Å to 40 Å, e.g., 20 Å to 30 Å. In one example, the first primer 148 is titanium.

A second dielectric layer 150 is located over the first reflective layer 146 (e.g., over the first primer layer 48). The second dielectric layer 150 can comprise one or more metal oxide or metal alloy oxide-containing films, such as those described above with respect to the first dielectric layer 140. For example, the second dielectric layer 150 can include a first metal oxide film 152, e.g., a zinc oxide film, deposited over the first primer film 148 and a second metal alloy oxide film 154, e.g., a zinc stannate ($Zn_2SnO_4$) film, deposited over the first zinc oxide film 152. An optional third metal oxide film 156, e.g., another zinc oxide layer, can be deposited over the zinc stannate layer.

The second dielectric layer 150 can have a total thickness (e.g., the combined thicknesses of the layers if more than one layer is present) is in the range of 50 Å to 1000 Å, e.g., 50 Å to 500 Å, e.g., 100 Å to 400 Å, e.g., 200 Å to 400 Å, e.g., 300 Å to 400 Å, e.g., 350 Å to 400 Å, e.g., 350 Å to 370 Å.

For example, for a multi-film layer, the zinc oxide film 152 (and optional second zinc oxide film 156, if present) can have a thickness in the range of 10 Å to 200 Å, e.g., 50 Å to 200 Å, e.g., 50 Å to 150 Å, e.g., 50 Å to 85 Å. The metal alloy oxide layer (zinc stannate) 54 can have a thickness in the range of 50 Å to 800 Å, e.g., 50 Å to 500 Å, e.g., 100 Å to 300 Å, e.g., 270 Å to 300 Å.

A subcritical (discontinuous) metallic layer 158 is located over the second dielectric layer 150 (e.g., over the second zinc oxide film 156, if present, or over the zinc stannate film 154 if not). The second metallic layer 158 can include any one or more of the metallic materials described above with respect to the first reflective layer 146. In one non-limiting embodiment, the second metallic layer 158 comprises islanded silver with the islands having an effective thickness in the range of 1 Å to 50 Å, e.g., 10 Å to 40 Å, e.g., 10 Å to 35 Å, e.g., 10 Å to 30 Å, e.g., 15 Å to 30 Å, e.g., 20 Å to 30 Å, e.g., 25 Å to 30 Å.

A second primer layer 160 can be deposited over the second metallic layer 158. The second primer layer 160 can be as described above with respect to the first primer layer 148. For example, the second primer layer can be titanium having a thickness in the range of 5 Å to 50 Å, e.g., 10 Å to 35 Å, e.g., 15 Å to 35 Å, e.g., 20 Å to 30 Å.

A third dielectric layer 162 can be deposited over the second reflective layer 158 (e.g., over the second primer layer 160). The third dielectric layer 162 can also include one or more metal oxide or metal alloy oxide-containing layers, such as discussed above with respect to the first and second dielectric layers 140, 150. In one example, the third dielectric layer 162 is a multi-film layer similar to the second dielectric layer 150. For example, the third dielectric layer 162 can include a first metal oxide layer 164, e.g., a zinc oxide layer, a second metal alloy oxide-containing layer 166, e.g., a zinc stannate layer deposited over the zinc oxide layer 164, and an optional third metal oxide layer 168, e.g., another zinc oxide layer, deposited over the zinc stannate layer 166. In one example, both of the zinc oxide layers 164, 168 are present and each has a thicknesses in the range of 50 Å to 200 Å, such as 75 Å to 150 Å, such as 80 Å to 150 Å, such as 95 Å to 100 Å. The metal alloy oxide layer 166 can have a thickness in the range of 100 Å to 800 Å, e.g., 200 Å to 700 Å, e.g., 300 Å to 600 Å, e.g., 500 Å to 600 Å, e.g., 560 Å to 600 Å.

In one example, the total thickness of the third dielectric layer 162 (e.g., the combined thicknesses of the zinc oxide and zinc stannate layers) is in the range of 200 Å to 1000 Å, e.g., 400 Å to 900 Å, e.g., 500 Å to 900 Å, e.g., 650 Å to 800 Å, e.g., 690 Å to 760 Å.

A third heat and/or radiation reflective metallic layer 170 is deposited over the third dielectric layer 162. The third reflective layer 170 can be of any of the materials discussed above with respect to the first and second reflective layers. In one non-limiting example, the third reflective layer 170 includes silver and has a thickness in the range of 25 Å to 300 Å, e.g., 50 Å to 300 Å, e.g., 50 Å to 200 Å, such as 70 Å to 200 Å, such as 100 Å to 200 Å, such as 170 Å to 200 Å.

A third primer layer 172 is located over the third reflective layer 170. The third primer layer 172 can be as described above with respect to the first or second primer layers. In one non-limiting example, the third primer layer is titanium and has a thickness in the range of 5 Å to 50 Å, e.g., 10 Å to 30 Å, e.g., 20 Å to 30 Å.

A fourth dielectric layer 174 is located over the third reflective layer (e.g., over the third primer film 172). The fourth dielectric layer 174 can be comprised of one or more metal oxide or metal alloy oxide-containing layers, such as those discussed above with respect to the first, second, or third dielectric layers 140, 150, 162. In one non-limiting example, the fourth dielectric layer 174 is a multi-film layer having a first metal oxide layer 176, e.g., a zinc oxide layer, deposited over the third primer film 172, and a second metal alloy oxide layer 178, e.g., a zinc stannate layer, deposited over the zinc oxide layer 176. In one non-limiting embodiment, the zinc oxide layer 176 can have a thickness in the range of 25 Å to 200 Å, such as 50 Å to 150 Å, such as 60 Å to 100 Å, such as 70 Å to 90 Å. The zinc stannate layer 178 can have a thickness in the range of 25 Å to 500 Å, e.g., 50 Å to 500 Å, e.g., 100 Å to 400 Å, e.g., 150 Å to 300 Å, e.g., 150 Å to 200 Å, e.g., 170 Å to 200 Å.

In one non-limiting example, the total thickness of the fourth dielectric layer 174 (e.g., the combined thicknesses of the zinc oxide and zinc stannate layers) is in the range of 100 Å to 800 Å, e.g., 200 Å to 600 Å, e.g., 250 Å to 400 Å, e.g., 250 Å to 270 Å.

An overcoat 180 can be located over the fourth dielectric layer 174. The overcoat 180 can help protect the underlying coating layers from mechanical and chemical attack. The overcoat 180 can be, for example, a metal oxide or metal nitride layer. For example, the overcoat 180 can be titania having a thickness in the range of 10 Å to 100 Å, such as 20 Å to 80 Å, such as 30 Å to 50 Å, such as 30 Å to 40 Å.

Figure 5:
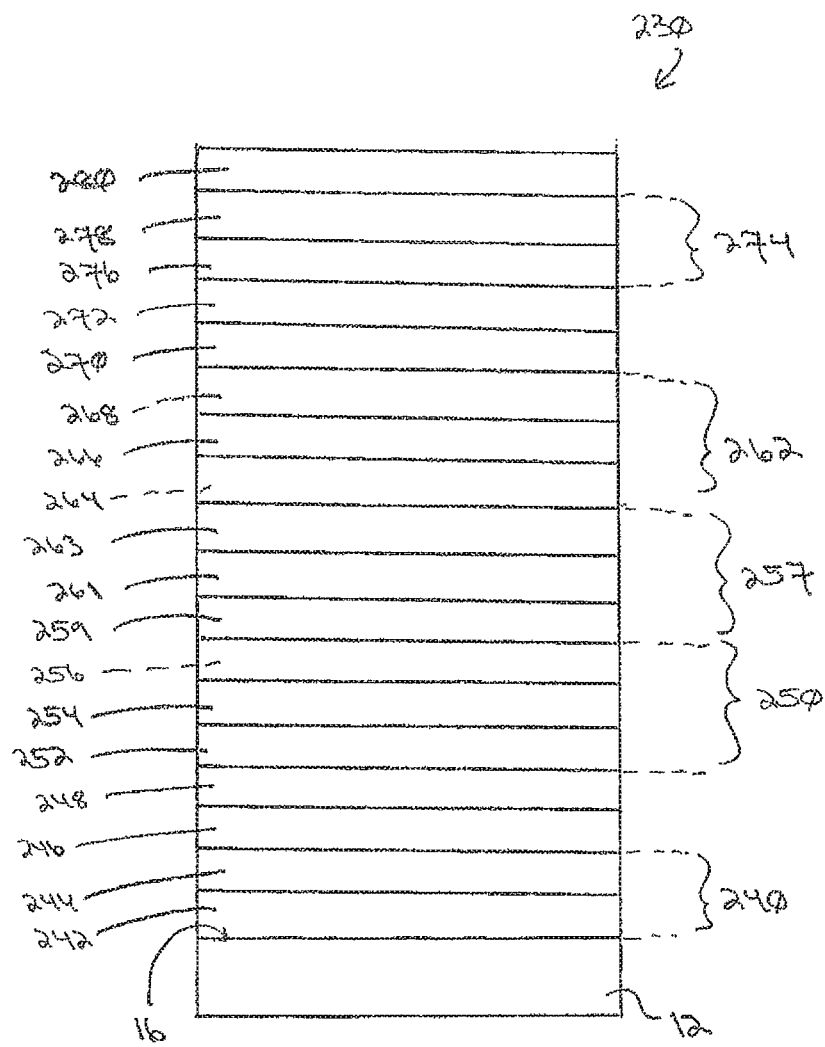
FIG. 5 is a side view (not to scale) of a further coating incorporating features of the invention.

Another exemplary non-limiting coating 230 of the invention is shown in FIG. 5. This exemplary coating 230 includes a base layer or first dielectric layer 240 deposited over at least a portion of a major surface of a substrate (e.g., the No. 2 surface 16 of the first ply 12). The first dielectric layer 240 can be a single layer or can comprise more than one film of antireflective materials and/or dielectric materials, such as, but not limited to, metal oxides, oxides of metal alloys, nitrides, oxynitrides, or mixtures thereof. The first dielectric layer 240 can be transparent to visible light. Examples of suitable metal oxides for the first dielectric layer 240 include oxides of titanium, hafnium, zirconium, niobium, zinc, bismuth, lead, indium, tin, and mixtures thereof. These metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate, defined below), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 240 can be a substantially single phase film, such as a metal alloy oxide film, e.g., zinc stannate, or can be a mixture of phases composed of zinc and tin oxides or can be composed of a plurality of films.

For example, the first dielectric layer 240 (whether a single film or multiple film layer) can have a thickness in the range of 100 Å to 600 Å, such as 200 Å to 500 Å, such as 250 Å to 350 Å, such as 250 Å to 310 Å, such as 280 Å to 310 Å, such as 290 Å to 300 Å.

The first dielectric layer 240 can comprise a multi-film structure having a first film 242, e.g., a metal alloy oxide film, deposited over at least a portion of a substrate (such as the inner major surface 16 of the first ply 12) and a second film 244, e.g., a metal oxide or oxide mixture film, deposited over the first metal alloy oxide film 242. In one non-limiting embodiment, the first film 242 can be zinc stannate.

For example, the first film 242 can be zinc stannate and the second film 244 can be zinc oxide (for example, 90 wt. % zinc oxide and 10 wt. % tin oxide). For example, the first film 242 can comprise zinc stannate having a thickness in the range of 50 Å to 600 Å, such as 50 Å to 500 Å, such as 75 Å to 350 Å, such as 100 Å to 250 Å, such as 150 Å to 250 Å, such as 200 Å to 250 Å, such as 200 Å to 240 Å.

The second film 244 can comprise zinc oxide having a thickness in the range of 50 Å to 200 Å, such as 50 Å to 175 Å, such as 50 Å to 150 Å, such as 50 Å to 100 Å.

A first heat and/or radiation reflective metallic layer 246 can be deposited over the first dielectric layer 240. The first reflective layer 246 can include a reflective metal, such as, but not limited to, metallic gold, copper, palladium, silver, or mixtures, alloys, or combinations thereof. In one embodiment, the first reflective layer 246 comprises a metallic silver layer having a thickness in the range of 25 Å to 300 Å, e.g., 50 Å to 300 Å, e.g., 50 Å to 250 Å, e.g., 50 Å to 200 Å, such as 70 Å to 200 Å, such as 100 Å to 200 Å, such as 140 Å to 180 Å.

A first primer layer 248 is located over the first reflective layer 246. The first primer layer 248 can be a single film or a multiple film layer. The first primer layer 248 can include an oxygen-capturing material that can be sacrificial during the deposition process to prevent degradation or oxidation of the first reflective layer 246 during the sputtering process or subsequent heating processes. The first primer layer 248 can also absorb at least a portion of electromagnetic radiation, such as visible light, passing through the coating 230. Examples of materials useful for the first primer layer 248 include titanium, Inconel, Stellite®, and mixtures thereof. For example, the first primer layer 248 can have a thickness in the range of 5 Å to 50 Å, e.g., 10 Å to 40 Å, e.g., 15 Å to 30 Å, e.g., 16 Å to 30 Å.

A second dielectric layer 250 is located over the first reflective layer 246 (e.g., over the first primer layer 248). The second dielectric layer 250 can comprise one or more metal oxide or metal alloy oxide-containing films, such as those described above with respect to the first dielectric layer 240. For example, the second dielectric layer 250 can include a first metal oxide film 252, e.g., a zinc oxide film, deposited over the first primer film 248 and a second metal alloy oxide film 254, e.g., a zinc stannate ($Zn_2SnO_4$) film, deposited over the first zinc oxide film 252. An optional third metal oxide film 256, e.g., another zinc oxide layer, can be deposited over the zinc stannate layer.

The second dielectric layer 250 can have a total thickness (e.g., the combined thicknesses of the layers) in the range of 50 Å to 1000 Å, e.g., 50 Å to 500 Å, e.g., 100 Å to 370 Å, e.g., 100 Å to 300 Å, e.g., 100 Å to 250 Å, e.g., 200 Å to 230 Å.

For example, for a multi-film layer, the zinc oxide film 252 (and optional third zinc oxide film 256, if present) can have a thickness in the range of 10 Å to 200 Å, e.g., 50 Å to 200 Å, e.g., 60 Å to 150 Å, e.g., 75 Å to 85 Å. The metal alloy oxide layer (zinc stannate) 254 can have a thickness in the range of 50 Å to 800 Å, e.g., 50 Å to 500 Å, e.g., 100 Å to 200 Å, e.g., 155 Å to 200 Å.

An absorbing layer 257 is located over the second dielectric layer 250 (e.g., over the third zinc oxide film 256, if present, or over the zinc stannate film 254 if not). The absorbing layer 257 can be a multilayer structure having a first absorbing layer 259, a metallic layer 261, and a second absorbing layer 263. The first and second absorbing layers 259, 263 can be the same or different materials. Material suitable for the absorbing layers includes metal or silicon oxide or nitrides. For example, the first and second absorbing layers 259, 265 can be silicon nitride. The first absorbing layer 259 can have a thickness in the range of 10 Å to 200 Å, e.g., 50 Å to 200 Å, e.g., 60 Å to 150 Å, e.g., 80 Å to 90 Å. The second absorbing layer 263 can also be silicon nitride and can have a thickness in the range of 10 Å to 200 Å, e.g., 50 Å to 200 Å, e.g., 60 Å to 150 Å, e.g., 75 Å to 100 Å.

The metallic layer 261 can be a subcritical thickness layer as described above. In one example, the metallic layer 261 is a cobalt-chromium alloy (such as Stellite®) and has a thickness in the range of 1 Å to 50 Å, e.g., 10 Å to 40 Å, e.g., 10 Å to 35 Å, e.g., 10 Å to 30 Å, e.g., 15 Å to 30 Å, e.g., 20 Å to 30 Å, e.g., 25 Å to 30 Å.

A third dielectric layer 262 can be deposited over the absorbing layer 257. The third dielectric layer 262 can also include one or more metal oxide or metal alloy oxide-containing layers, such as discussed above with respect to the first and second dielectric layers 240, 250. In one example, the third dielectric layer 262 is a multi-film layer similar to the second dielectric layer 250. For example, the third dielectric layer 262 can include an optional first metal oxide layer 264, e.g., a zinc oxide layer, a second metal alloy oxide-containing layer 266, e.g., a zinc stannate layer deposited over the zinc oxide layer 264 (if present), and an optional third metal oxide layer 268, e.g., another zinc oxide layer, deposited over the zinc stannate (second) layer 266. In one example, the first zinc oxide layer 264 (if present) and the third zinc oxide layer 268 can each have a thickness in the range of 50 Å to 200 Å, such as 75 Å to 150 Å, such as 80 Å to 150 Å, such as 95 Å to 105 Å. The metal alloy oxide layer (second) 266 can have a thickness in the range of 100 Å to 800 Å, e.g., 200 Å to 700 Å, e.g., 300 Å to 600 Å, e.g., 380 Å to 500 Å, e.g., 420 Å to 450 Å.

In one example, the total thickness of the third dielectric layer 262 (e.g., the combined thicknesses of the zinc oxide and zinc stannate layers) is in the range of 200 Å to 1000 Å, e.g., 400 Å to 900 Å, e.g., 500 Å to 900 Å, e.g., 500 Å to 600 Å, e.g., 525 Å to 550 Å.

A third heat and/or radiation reflective metallic layer 270 is deposited over the third dielectric layer 262. The third reflective layer 270 can be of any of the materials discussed above with respect to the first and second reflective layers. In one non-limiting example, the third reflective layer 270 includes silver and has a thickness in the range of 25 Å to 300 Å, e.g., 50 Å to 300 Å, e.g., 50 Å to 200 Å, such as 70 Å to 150 Å, such as 100 Å to 150 Å, such as 128 Å to 150 Å.

A third primer layer 272 is located over the third reflective layer 270. The third primer layer 272 can be as described above with respect to the first or second primer layers. In one non-limiting example, the third primer layer is titanium and has a thickness in the range of 5 Å to 50 Å, e.g., 10 Å to 30 Å, e.g., 17 Å to 30 Å.

A fourth dielectric layer 274 is located over the third reflective layer (e.g., over the third primer layer 272). The fourth dielectric layer 274 can be comprised of one or more metal oxide or metal alloy oxide-containing layers, such as those discussed above with respect to the first, second, or third dielectric layers 240, 250, 262. In one non-limiting example, the fourth dielectric layer 274 is a multi-film layer having a first metal oxide layer 276, e.g., a zinc oxide layer, deposited over the third primer film 272, and a second metal alloy oxide layer 278, e.g., a zinc stannate layer, deposited over the zinc oxide layer 276. In one non-limiting embodiment, the zinc oxide layer 276 can have a thickness in the range of 25 Å to 200 Å, such as 50 Å to 150 Å, such as 60 Å to 100 Å, such as 60 Å to 70 Å. The zinc stannate layer 78 can have a thickness in the range of 25 Å to 500 Å, e.g., 50 Å to 500 Å, e.g., 100 Å to 400 Å, e.g., 150 Å to 300 Å, e.g., 150 Å to 200 Å, e.g., 180 Å to 190 Å.

In one non-limiting example, the total thickness of the fourth dielectric layer 274 (e.g., the combined thickness of the zinc oxide and zinc stannate layers) is in the range of 100 Å to 800 Å, e.g., 200 Å to 600 Å, e.g., 250 Å to 400 Å, e.g., 250 Å to 270 Å.

An overcoat 280 can be located over the fourth dielectric layer 274. The overcoat 280 can help protect the underlying coating layers from mechanical and chemical attack. The overcoat 280 can be, for example, a metal oxide or metal nitride layer. For example, the overcoat 280 can be titania having a thickness in the range of 10 Å to 100 Å, such as 20 Å to 80 Å, such as 30 Å to 50 Å, such as 30 Å to 40 Å.

Figure 6:
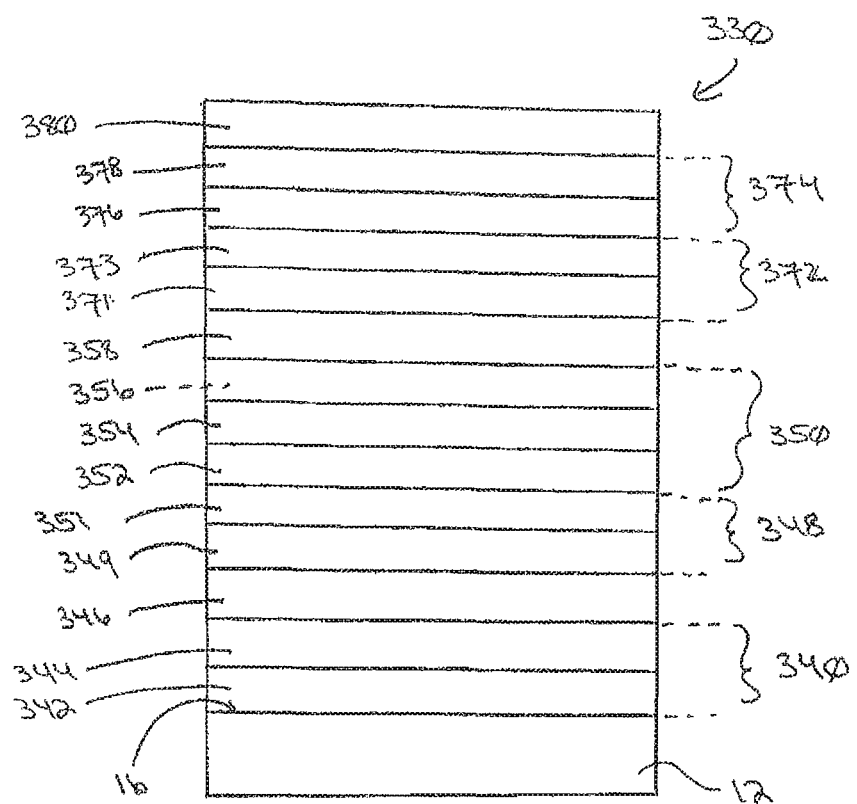
FIG. 6 is a side view (not to scale) of a still further coating incorporating features of the invention.

Another exemplary non-limiting coating 330 of the invention is shown in FIG. 6. This exemplary coating 330 includes a base layer or first dielectric layer 340 deposited over at least a portion of a major surface of a substrate (e.g., the No. 2 surface 16 of the first ply 12). The first dielectric layer 340 can be similar to the first dielectric layer 40 described above. For example, the first dielectric layer 340 can be a single layer or can comprise more than one film of antireflective materials and/or dielectric materials, such as, but not limited to, metal oxides, oxides of metal alloys, nitrides, oxynitrides, or mixtures thereof. The first dielectric layer 340 can be transparent to visible light. Examples of suitable metal oxides for the first dielectric layer 340 include oxides of titanium, hafnium, zirconium, niobium, zinc, bismuth, lead, indium, tin, and mixtures thereof. These metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate, defined below), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 340 can be a substantially single phase film, such as a metal alloy oxide film, e.g., zinc stannate, or can be a mixture of phases composed of zinc and tin oxides or can be composed of a plurality of films.

For example, the first dielectric layer 340 (whether a single film or multiple film layer) can have a thickness in the range of 100 Å to 800 Å, such as 100 Å to 600 Å, such as 200 Å to 600 Å, such as 400 Å to 500 Å, such as 440 Å to 500 Å.

The first dielectric layer 340 can comprise a multi-film structure having a first film 342, e.g., a metal alloy oxide film, deposited over at least a portion of a substrate (such as the inner major surface 16 of the first ply 12) and a second film 344, e.g., a metal oxide or oxide mixture film, deposited over the first metal alloy oxide film 342. In one non-limiting embodiment, the first film 342 can be zinc stannate.

For example, the first film 342 can be zinc stannate and the second film 344 can be zinc oxide (for example, 90 wt. % zinc oxide and 10 wt. % tin oxide). For example, the first film 342 can comprise zinc stannate having a thickness in the range of 50 Å to 600 Å, such as 50 Å to 500 Å, such as 75 Å to 400 Å, such as 200 Å to 400 Å, such as 300 Å to 400 Å, such as 355 Å to 400 Å.

The second film 344 can comprise zinc oxide having a thickness in the range of 50 Å to 200 Å, such as 50 Å to 150 Å, such as 85 Å to 100 Å.

A first heat and/or radiation reflective metallic layer 346 can be deposited over the first dielectric layer 340. The first reflective layer 346 can include a reflective metal, such as, but not limited to, metallic gold, copper, silver, or mixtures, alloys, or combinations thereof. In one embodiment, the first reflective layer 346 comprises a metallic silver layer having a thickness in the range of 25 Å to 300 Å, e.g., 50 Å to 300 Å, e.g., 50 Å to 250 Å, e.g., 50 Å to 200 Å, such as 70 Å to 200 Å, such as 70 Å to 100 Å, such as 73 Å to 100 Å.

A first primer layer 348 is located over the first reflective layer 346. The first primer layer 348 can be a single film or a multiple film layer. The first primer layer 348 can include an oxygen-capturing material that can be sacrificial during the deposition process to prevent degradation or oxidation of the first reflective layer 346 during the sputtering process or subsequent heating processes. The first primer layer 348 can also absorb at least a portion of electromagnetic radiation, such as visible light, passing through the coating 330. Examples of materials useful for the first primer layer 348 include titanium, Inconel, Stellite®, and mixtures thereof. For example, the first primer layer 348 can be a multi-film layer having a first primer film 349 and a second primer film 351. The first and second primer films 349, 351 are typically of different materials. For example, the first primer film 349 can be Inconel having a thickness in the range of 1 Å to 10 Å, e.g., 1 Å to 5 Å. The second primer film 351 can be titanium having a thickness in the range of 5 Å to 20 Å, e.g., 10 Å to 15 Å.

A second dielectric layer 350 is located over the first reflective layer 346 (e.g., over the first primer layer 348). The second dielectric layer 350 can comprise one or more metal oxide or metal alloy oxide-containing films, such as those described above with respect to the first dielectric layer 340. For example, the second dielectric layer 350 can include a first metal oxide film 352, e.g., a zinc oxide film, deposited over the first primer film 348 and a second metal alloy oxide film 354, e.g., a zinc stannate ($Zn_2SnO_4$) film, deposited over the first zinc oxide film 352. An optional third metal oxide film 356, e.g., another zinc oxide layer, can be deposited over the zinc stannate layer.

The second dielectric layer 350 can have a total thickness (e.g., the combined thicknesses of the layers if more than one layer is present) is in the range of 50 Å to 1000 Å, e.g., 50 Å to 800 Å, e.g., 100 Å to 800 Å, e.g., 200 Å to 800 Å, e.g., 500 Å to 700 Å, e.g., 650 Å to 700 Å.

For example, for a multi-film layer, the zinc oxide film 352 (and optional third zinc oxide film 356, if present) can have a thickness in the range of 10 Å to 200 Å, e.g., 50 Å to 200 Å, e.g., 50 Å to 150 Å, e.g., 50 Å to 75 Å. The metal alloy oxide layer (zinc stannate) 54 can have a thickness in the range of 50 Å to 800 Å, e.g., 50 Å to 500 Å, e.g., 100 Å to 500 Å, e.g., 400 Å to 500 Å.

A reflective metallic layer 358 is located over the second dielectric layer 350 (e.g., over the third zinc oxide film 356, if present, or over the zinc stannate film 354 if not). In one non-limiting embodiment, the second reflective layer 358 comprises silver having a thickness in the range of 50 Å to 300 Å, e.g., 100 Å to 200 Å, e.g., 150 Å to 200 Å, e.g., 170 Å to 200 Å.

A second primer layer 372 can be deposited over the second reflective layer 358. The second primer layer 372 can be as described above with respect to the first primer layer 348. For example, the second primer layer 372 can be a multi-film layer having a first primer film 371 and a second primer film 373. The first and second primer films 371, 373 are typically of different materials. For example, the first primer film 371 can be Inconel having a thickness in the range of 1 Å to 15 Å, e.g., 5 Å to 10 Å. The second primer film 373 can be titanium having a thickness in the range of 5 Å to 20 Å, e.g., 10 Å to 15 Å.

A third dielectric layer 374 can be deposited over the second reflective layer 358 (e.g., over the second primer film 372). The third dielectric layer 374 can also include one or more metal oxide or metal alloy oxide-containing layers, such as discussed above with respect to the first and second dielectric layers 340, 350. In one example, the third dielectric layer 374 is a multi-film layer similar to the second dielectric layer 350. In one non-limiting example, the third dielectric layer 374 is a multi-film layer having a first metal oxide layer 376, e.g., a zinc oxide layer, deposited over the second primer layer 372, and a second metal alloy oxide layer 378, e.g., a zinc stannate layer, deposited over the zinc oxide layer 376. In one non-limiting embodiment, the zinc oxide layer 376 can have a thickness in the range of 25 Å to 200 Å, such as 50 Å to 150 Å, such as 100 Å to 150 Å. The zinc stannate layer 378 can have a thickness in the range of 25 Å to 500 Å, e.g., 50 Å to 500 Å, e.g., 100 Å to 400 Å, e.g., 200 Å to 350 Å, e.g., 300 Å to 350 Å, e.g., 320 Å to 350 Å.

In one non-limiting example, the total thickness of the third dielectric layer 374 (e.g., the combined thicknesses of the zinc oxide and zinc stannate layers) is in the range of 100 Å to 800 Å, e.g., 200 Å to 600 Å, e.g., 250 Å to 500 Å, e.g., 470 Å to 500 Å.

An overcoat 380 can be located over the third dielectric layer 374. The overcoat 380 can help protect the underlying coating layers from mechanical and chemical attack. The overcoat 380 can be, for example, a metal oxide or metal nitride layer. For example, the overcoat 380 can be titania having a thickness in the range of 10 Å to 100 Å, such as 20 Å to 80 Å, such as 30 Å to 50 Å, such as 30 Å to 40 Å.

Figure 7:
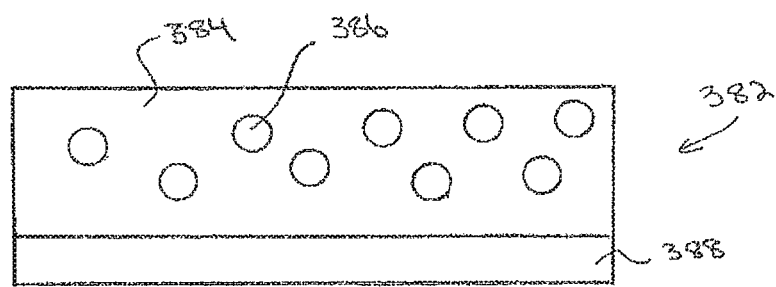
FIG. 7 is a side, sectional view (not to scale) of a further coating of the invention.

As described above, the subcritical silver layer can be applied onto a surface and then another layer, such as a metal oxide or metal layer can be applied over the subcritical silver layer to essentially encapsulate and protect the silver islands. However, in another embodiment of the invention, a nanocomposite layer can be deposited with a nanocrystalline metallic phase embedded or incorporated within a dielectric matrix phase. FIG. 7 shows a nanocomposite layer 382 having a first material 384 with metallic nanoparticles 386 incorporated into the first material 382 deposited on a substrate 388. This nanocomposite layer 382 could take the place of one or more metallic silver layers in a solar control coating, for example, such as any of the coatings described above. Such a nanocomposite layer 382 could be provided by conventional reactive sputtering using a target having a first material and at least one second material. The first material can be a material that has a relatively stronger tendency to nitride or oxidize than the second material. These materials could be present either as alloys or as a composite target. For example, the first material could be Cr, Al, Ti, or Si. The second material could be a noble metal, such as Ag, Cu, or Au or a transition metal including Fe, Ni, or Co. When the target is sputtered, for example, in an oxygen containing atmosphere, the first material oxidizes and forms a dielectric matrix phase and the second material is contained within the phase, such as in the form of metal nanoparticles. The nanocomposite layer 382 can be adjusted by appropriate selection of the reactive gas, sputtering voltage, etc., to form a nanocomposite layer of a desired thickness. This nanocomposite layer 382 having the metallic particles 386 embedded within the first material 384 can better withstand the high temperatures associated with heat treating or tempering than coatings with continuous metallic films.

In some applications, it may be desirable to modify particular transmitted color without affecting the solar control performance of the coating. One way to do this would be by the use of integrating a semiconductor material into a solar control coating that has a band gap edge in the visible region of the electromagnetic spectrum. As will be appreciated by one skilled in the art, at the edge of a semiconductor band gap, shorter wave length radiation is absorbed by the semiconductor material while longer wavelength energy is transmitted through the material. That is, the material is transparent to radiation above the edge of the band gap. By selecting a material having a band gap edge in the visible region, one can select the wavelength of electromagnetic radiation that is absorbed or passes through the semiconductor material. By using semiconductor materials with small band gaps, such as but not limited to, germanium or germanium-based alloys, the absorption edge can be placed near the long-wavelength side of the visible spectrum. In this way, the optical transmission can be reduced without absorbing near or far infrared radiation, minimizing unnecessary heating of the glass into absorption. This semiconductor material can be placed within a conventional solar control coating, such as between two silver layers, above a silver layer, below a silver layer, or anywhere else within the stack.

Figure 8:
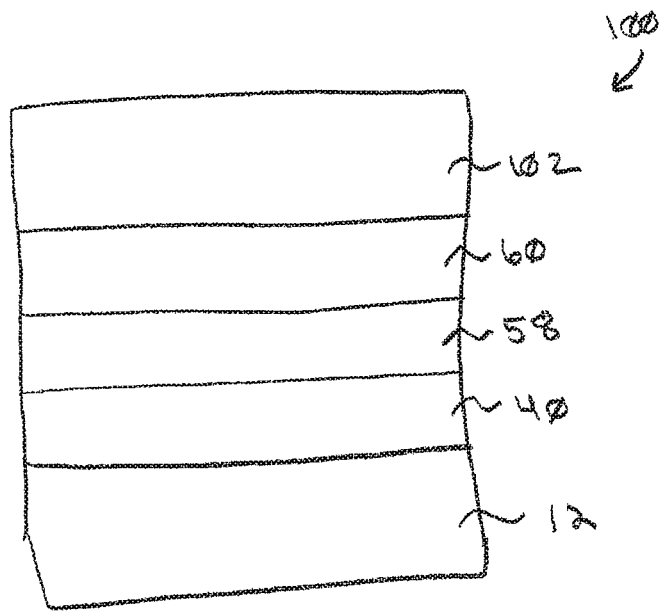
FIG. 8 is a side view (not to scale) of another coating incorporating features of the invention.

Another exemplary coating 100 is illustrated in FIG. 8. The coating 100 includes a first dielectric layer 40, as described above. A subcritical metallic layer 58 is located over the first dielectric layer 40. An optional primer 60 can be located over the subcritical metallic layer 58. A second dielectric layer 102 is located over the subcritical metallic layer 58 (such as over the primer layer 60, if present). The second dielectric layer 102 can be, for example, as described above for dielectric layers 62 or 74. An optional overcoat 80 can be located over the second dielectric layer 102.

Figure 9:
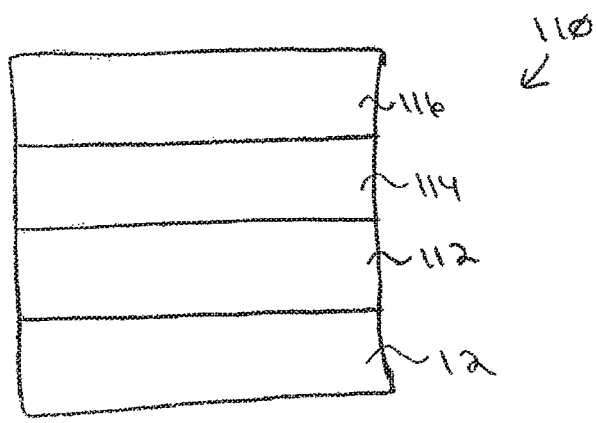
FIG. 9 is a side view (not to scale) of a further coating incorporating features of the invention.

A further exemplary coating 110 is shown in FIG. 9. The coating 110 includes a first dielectric layer 112, an absorbing layer 114, and a second dielectric layer 116. The first dielectric layer 112 can be as described above for dielectric layer 40. The absorbing layer can include one or more of a cobalt chrome material, a nickel chrome material, and a titanium nitride material. An optional primer layer (not shown) can be located over the absorbing layer 114. The primer layer can be as described above for primer layer 48 or primer layer 60. The second dielectric layer 116 can be as described above for the dielectric layers 40, 50, 62, Or 74. An optional overcoat (not shown), such as overcoat 80 described above, can be located over the second dielectric layer 116.

The color absorbed by the subcritical metal layer depends upon the refractive index of the material deposited over (e.g., on) the subcritical metal islands. This can be the primer material, if present, or the overlying dielectric material. The dielectric layer under the subcritical metallic layer can also affect the optical properties, e.g., reflected and transmitted color, of the coating. In the practice of the invention, by selecting a particular metal for the subcritical metallic layer, selecting a primer material and thickness, and selecting dielectric material(s) and thickness, the absorbed color (e.g., tint) of the coating can be varied to simulate the color of conventional tinted glass.

While the above embodiment illustrated a multilayer coating with two continuous and one discontinuous metal layer, it is to be understood that the invention is not limited to this particular embodiment.

The color absorbed by the subcritical metal layer depends upon the refractive index of the material deposited over (e.g., on) the subcritical metal islands. This can be the primer material, if present, or the overlying dielectric material. The dielectric layer under the subcritical metallic layer can also affect the optical properties, e.g., reflected and transmitted color, of the coating. In the practice of the invention, by selecting a particular metal for the subcritical metallic layer, selecting a primer material and thickness, and selecting dielectric material(s) and thickness, the absorbed color (e.g., tint) of the coating can be varied to simulate the color of conventional tinted glass.

The following Examples illustrate various embodiments of the invention. However, it is to be understood that the invention is not limited to these specific embodiments.

EXAMPLES

In the following Examples, "Rf" refers to the film side reflectance, "Rg" refers to the glass side reflectance, "T" refers to the transmittance through the article, "Rg60" refers to the glass side reflectance at a 60 degree angle, "Rx" refers to the exterior reflectance of a standard IGU from the No. 1 surface, "Rint" refers to the reflectance of the IGU from the inside (No. 4) surface, "VLT" refers to the visible light transmittance, and "SHGC" refers to the solar heat gain coefficient. A "standard IGU" has an outer ply of 6 mm thick glass, an inner ply of 6 mm glass, a 0.5 inch (1.27 cm) gap filled with air, with the coating on the No. 2 surface. "S.C." means "subcritical" thickness (that is, the layer was not a continuous layer but was deposited to form discontinuous coating regions.)

In the following examples, "heat treated" means that the coated substrate was heated in a box furnace to a temperature of 1,185° F. to simulate tempering and then air cooled to room temperature before the optical characteristics were measured.

The color coordinates a*, b*, and L* are those of the conventional CIE (1931) and CIELAB systems that will be understood by one of ordinary skill in the art.

In order to model the response of the subcritical layer structure to electromagnetic radiation so that the optical properties of the entire stack can be optimized and controlled, the subcritical layer can be modeled as two idealized layers. These idealized layers have uniform optical properties (i.e., index of refraction (n) and extinction co-efficient (k)) through their thickness, as do the other layers in the stack. Thus, the thicknesses referred to in the examples are the thicknesses of these idealized layers and are meaningful in the context of calculating the optical response of a given coating stack containing these layers.

Also, the thickness values associated with the "subcritical" layers in the following Examples are "effective thickness" calculated based on a reference coating speed that is slower than the actual coating speed of the commercial coater. For example, a silver layer is applied onto a substrate at the same coating rate as a commercial coater but at a reduced line speed (reference coating speed) compared to the commercial coater. The thickness of the coating deposited at the reference coating speed is measured and then the "effective thickness" for a coating deposited at the same coating rate but at the faster line speed of the commercial coater is extrapolated. For example, if a particular coating rate provides a silver coating of 250 Å at reference coating speed that is one-tenth the line speed of the commercial coater, then the "effective thickness" of the silver layer at the same coating rate but at the commercial coater line speed (i.e., ten time faster than the reference coating run) is extrapolated to be 25 Å (i.e., one tenth the thickness). However, as will be appreciated, the silver layer at this effective thickness (below the subcritical thickness) would not be a continuous layer but rather would be a discontinuous layer having discontinuous regions of silver material.

Example 1

A coating was deposited by a conventional MSVD coater (commercially available from Applied Materials) on a 6 mm piece of clear glass. The coated glass had the following structure:

| | |
|---|---|
| titania | 40 Å |
| zinc stannate | 190 Å |
| zinc oxide (90/10) | 80 Å |
| titanium | 30 Å |
| silver | 150 Å |
| zinc oxide | 120 Å |
| zinc stannate | 450 Å |
| zinc oxide | 120 Å |
| Inconel | 22 Å |
| S.C. silver | 25 Å |
| zinc stannate | 110 Å |
| zinc oxide | 70 Å |
| titanium | 30 Å |
| silver | 180 Å |
| zinc oxide | 110 Å |
| zinc stannate | 200 Å |
| clear glass | 6 mm |

This coated glass was heat treated as described above and had the optical characteristics shown in Table 1 below. The article was incorporated into a standard IGU as the outer ply (the inner ply was uncoated 6 mm clear glass) and had the optical characteristics set forth in Table 2 below.

Example 2

A coating was deposited by a conventional Airco MSVD coater on a 6 mm piece of Starphire® glass. The coated glass had the following structure:

| | |
|---|---|
| titania | 40 Å |
| zinc stannate | 170 Å |
| zinc oxide (90/10) | 80 Å |
| titanium | 20 Å |
| silver | 150 Å |
| zinc oxide | 120 Å |
| zinc stannate | 480 Å |
| zinc oxide | 120 Å |
| Inconel | 22 Å |
| S.C. silver | 25 Å |
| zinc stannate | 110 Å |
| zinc oxide | 70 Å |
| titanium | 20 Å |
| silver | 180 Å |
| zinc oxide | 110 Å |
| zinc stannate | 220 Å |
| Starphire ® glass | 6 mm |

This coated glass was heat treated as described above and had the optical characteristics shown in Table 1 below. The article was incorporated into a standard IGU as the outer ply (the inner ply was uncoated 6 mm Starphire® glass) and had the optical characteristics set forth in Table 2 below.

Example 3

A coating was deposited by a conventional Airco MSVD coater on a 6 mm piece of Optiblue® glass. The coated glass had the following structure:

| | |
|---|---|
| titania | 40 Å |
| zinc stannate | 170 Å |
| zinc oxide (90/10) | 80 Å |
| titanium | 20 Å |
| silver | 150 Å |
| zinc oxide | 120 Å |
| zinc stannate | 480 Å |
| zinc oxide | 120 Å |
| Inconel | 22 Å |
| S.C. silver | 25 Å |
| zinc stannate | 110 Å |
| zinc oxide | 70 Å |
| titanium | 20 Å |
| silver | 180 Å |
| zinc oxide | 110 Å |
| zinc stannate | 220 Å |
| Optiblue ® glass | 6 mm |

This coated glass was heat treated as described above and had the optical characteristics shown in Table 1 below. The article was incorporated into a standard IGU as the outer ply (the inner ply was uncoated 6 mm Starphire® glass) and had the optical characteristics set forth in Table 2 below.

Example 4

A coating was deposited by a conventional Airco MSVD coater on a 6 mm piece of clear glass. The coated glass had the following structure:

| | |
|---|---|
| titania | 40 Å |
| zinc stannate | 200 Å |
| zinc oxide (90/10) | 70 Å |
| titanium | 30 Å |
| silver | 170 Å |
| zinc oxide | 100 Å |
| zinc stannate | 560 Å |
| zinc oxide | 100 Å |
| titanium | 30 Å |
| S.C. silver | 25 Å |
| Zinc oxide | 50 Å |

-continued

| | |
|---|---|
| zinc stannate | 270 Å |
| zinc oxide | 50 Å |
| titanium | 30 Å |
| silver | 120 Å |
| zinc oxide | 70 Å |
| zinc stannate | 140 Å |
| clear glass | 6 mm |

This coated glass was heat treated as described above and had the optical characteristics shown in Table 1 below. The article was incorporated into a standard IGU as the outer ply (the inner ply was uncoated 6 mm clear glass) and had the optical characteristics set forth in Table 2 below.

Example 5

A coating was deposited by a conventional Airco MSVD coater on a 6 mm piece of clear glass. The coated glass had the following structure:

| | |
|---|---|
| titania | 40 Å |
| zinc stannate | 170 Å |
| zinc oxide (90/10) | 80 Å |
| titanium | 30 Å |
| silver | 137 Å |
| zinc oxide | 95 Å |
| zinc stannate | 380 Å |
| zinc oxide | 95 Å |
| Inconel | 15 Å |
| S.C. silver | 30 Å |
| zinc stannate | 235 Å |
| zinc oxide | 85 Å |
| titanium | 30 Å |
| silver | 125 Å |
| zinc oxide | 100 Å |
| zinc stannate | 200 Å |
| clear glass | 6 mm |

This coated glass was heat treated as described above and had the optical characteristics shown in Table 1 below. The article was incorporated into a standard IGU as the outer ply (the inner ply was uncoated 6 mm clear glass) and had the optical characteristics set forth in Table 2 below.

Example 6

A coating was deposited by a conventional Airco MSVD coater on a 6 mm piece of clear glass. The coated glass had the following structure:

| | |
|---|---|
| titania | 40 Å |
| zinc stannate | 320 Å |
| zinc oxide (90/10) | 150 Å |
| titanium | 15 Å |
| Inconel | 15 Å |
| silver | 170 Å |
| zinc oxide | 75 Å |
| zinc stannate | 500 Å |
| zinc oxide | 75 Å |
| titanium | 15 Å |
| Inconel | 5 Å |
| silver | 73 Å |
| zinc oxide | 85 Å |
| zinc stannate | 355 Å |
| clear glass | 6 mm |

This coated glass was not heat treated and had the optical characteristics shown in Table 1 below. The article was incorporated into a standard IGU as the outer ply (the inner ply was uncoated 6 mm clear glass) and had the optical characteristics set forth in Table 2 below.

Example 7

A coating was deposited by a conventional Airco MSVD coater on a 6 mm piece of clear glass. The coated glass had the following structure:

| | |
|---|---|
| titania | 40 Å |
| zinc stannate | 190 Å |
| zinc oxide (90/10) | 60 Å |
| titanium | 17 Å |
| silver | 128 Å |
| zinc oxide | 105 Å |
| zinc stannate | 420 Å |
| zinc oxide | 120 Å |
| silicon nitride | 100 Å |
| Stellite ® | 30 Å |
| silicon nitride | 80 Å |
| zinc stannate | 155 Å |
| zinc oxide | 75 Å |
| titanium | 16 Å |
| silver | 140 Å |
| zinc oxide | 50 Å |
| zinc stannate | 240 Å |
| clear glass | 6 mm |

This coated glass was not heat treated and the had optical characteristics shown in Table 1 below. The article was incorporated into a standard IGU as the outer ply (the inner ply was uncoated 6 mm clear glass) and had the optical characteristics set forth in Table 2 below.

Example 8

A coating was deposited by a conventional Airco MSVD coater on a 6 mm piece of clear glass. The coated glass had the following structure:

| | |
|---|---|
| titania | 40 Å |
| zinc stannate | 180 Å |
| zinc oxide (90/10) | 70 Å |
| titanium | 30 Å |
| silver | 128 Å |
| zinc oxide | 105 Å |
| zinc stannate | 420 Å |
| zinc oxide | 120 Å |
| silicon nitride | 100 Å |
| Stellite ® | 30 Å |
| silicon nitride | 80 Å |
| zinc stannate | 155 Å |
| zinc oxide | 75 Å |
| titanium | 30 Å |
| silver | 140 Å |
| zinc oxide | 50 Å |
| zinc stannate | 240 Å |
| clear glass | 6 mm |

This coated glass was heat treated as described above and had the optical characteristics shown in Table 1 below. The article was incorporated into a standard IGU as the outer ply (the inner ply was uncoated 6 mm clear glass) and had the optical characteristics set forth in Table 2 below.

Example 9

A coating was deposited by a conventional Airco MSVD coater on a 6 mm piece of clear glass. The coated glass had the following structure:

| | |
|---|---|
| titania | 43 Å |
| zinc stannate | 196 Å |
| zinc oxide (90/10) | 81 Å |
| titanium | 33 Å |
| silver | 151 Å |
| zinc oxide | 120 Å |
| zinc stannate | 448 Å |
| zinc oxide | 120 Å |
| Inconel | 22 Å |
| S.C. silver | 26 Å |
| zinc stannate | 116 Å |
| zinc oxide | 70 Å |
| titanium | 35 Å |
| silver | 182 Å |
| zinc oxide | 110 Å |
| zinc stannate | 198 Å |
| clear glass | 6 mm |

TABLE 1

| Example No. | RfL* | Rfa* | Rfb* | RgL* | Rga* | Rgb* | TL* | Ta* | Tb* | Rg60L* | Rg60a* | Rg60b* |
|---|---|---|---|---|---|---|---|---|---|---|---|---|
| 1 | 31.4 | −3.15 | −22.31 | 61.58 | −0.86 | −0.54 | 73.97 | −4.61 | −3.32 | 63.10 | −7.10 | −1.30 |
| 2 | 34.6 | 6.2 | 19.3 | 62.6 | 1.0 | −0.9 | 75.2 | 4.0 | 2.2 | NA | NA | NA |
| 3 | 31.6 | −5.1 | −20.7 | 49.6 | 0.2 | −6.9 | 65.4 | −3.8 | −7.3 | NA | NA | NA |
| 4 | 44.5 | −0.5 | −9.7 | 58.6 | −3.2 | 0.4 | 76.3 | −6.3 | −6.0 | NA | NA | NA |
| 5 | 30.4 | −6.7 | −9.5 | 44 | −1.7 | −3.5 | 84.9 | −3.0 | 0.9 | NA | NA | NA |
| 6 | 57.53 | −1.65 | −3.83 | 58.19 | −1.69 | 2.07 | 72.23 | −3.46 | −3.57 | NA | NA | NA |
| 7 | 31.0 | −1.8 | −12.1 | 58.1 | −1.3 | 1.7 | 73.0 | −5.7 | −0.7 | NA | NA | NA |
| 8 | 33.2 | −1.3 | −12.1 | 61.5 | −2.2 | 2.2 | 72.2 | −4.5 | −1.4 | NA | NA | NA |

TABLE 2

| Example No. | RxL* | Rxa* | Rxb* | RintL* | Rinta* | Rintb* | TL* | Ta* | Tb* | Rx | Rint | VLT | SHGC |
|---|---|---|---|---|---|---|---|---|---|---|---|---|---|
| 1 | 63.07 | −1.16 | −0.87 | 44.02 | −2.57 | −13 | 70.75 | −5.81 | −3.53 | 32 | 14 | 42 | 0.232 |
| 2 | 64.2 | 0.4 | −1.0 | 45.8 | −3.9 | −12.2 | 72.6 | −4.1 | −2.3 | 33 | 15 | 44 | 0.234 |
| 3 | 50.8 | 0.8 | −8.2 | 43.6 | −2.6 | −13.2 | 62.4 | −5.3 | −7.1 | 19 | 13 | 31 | 0.2 |
| 4 | 60.7 | −3.6 | −0.5 | 51.8 | −1.9 | −6.9 | 73.4 | −7.5 | −5.6 | 29 | 20 | 45 | 0.27 |
| 5 | NA | NA | NA | NA | NA | NA | NA | NA | NA | NA | NA | NA | NA |
| 6 | 60.0 | −2.2 | 1.4 | 61.1 | −3.6 | −2.7 | 69.8 | −4.5 | −3.5 | 28 | 29 | 40 | 0.240 |
| 7 | 59.4 | −1.2 | 1.0 | 43.6 | −1.5 | −7.6 | 69.7 | −6.8 | −0.7 | 28 | 14 | 40 | 0.23 |
| 8 | 62.5 | −1.8 | 1.4 | 44.6 | −1.1 | −8.2 | 69.1 | −5.7 | −0.9 | 31 | 14 | 39 | 0.23 |

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A coated article having a tinted appearance in reflection and/or transmission, comprising:
    a substrate; and
    a solar control coating, wherein the solar control coating consists of:
        a first dielectric layer;
        a subcritical metallic layer having discontinuous metallic regions and having a thickness in a range of 5 Å to 50 Å, wherein the subcritical metallic layer consists of silver; and
        a second dielectric layer over the subcritical metallic layer.

2. The article of claim 1, further comprising an overcoat over the solar control coating.

3. The article of claim 2, wherein the overcoat comprises a metal oxide layer, a metal nitride layer, or mixtures thereof.

4. The article of claim 1, wherein the second dielectric layer comprises one or more layers selected from zinc-tin oxides, zinc oxide, silicon-aluminum oxides, silicon-aluminum nitrides, titanium oxides, and titanium nitrides.

5. A coated article having a tinted appearance in reflection and/or transmission, comprising:
    a substrate; and
    a solar control coating, where the solar control coating consists of:
        a first dielectric layer;
        a subcritical metallic layer having discontinuous metallic regions and having a thickness in a range of 5 Å to 50 Å, wherein the subcritical metallic layer consists of silver;
        a primer layer; and
        a second dielectric layer over the subcritical metallic layer.

6. The article of claim 5, further comprising an overcoat over the solar control coating.

7. The article of claim 6, wherein the overcoat comprises a metal oxide layer, a metal nitride layer, or mixtures thereof.

8. The article of claim 5, wherein the second dielectric layer comprises one or more layers selected from zinc-tin oxides, zinc oxide, silicon-aluminum oxides, silicon-aluminum nitrides, titanium oxides, and titanium nitrides.

9. The article of claim 5, wherein the primer layer comprises titanium.

* * * * *